United States Patent
Alhashim et al.

(10) Patent No.: US 11,592,381 B2
(45) Date of Patent: Feb. 28, 2023

(54) HIGH THROUGHPUT HIGH RESOLUTION GAS SORPTION SCREENING

(71) Applicant: Saudi Arabian Oil Company, Dhahran (SA)

(72) Inventors: Mohammad G. Alhashim, Dhahran (SA); Mohammed Alshammasi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 164 days.

(21) Appl. No.: 17/162,534

(22) Filed: Jan. 29, 2021

(65) Prior Publication Data

US 2022/0244162 A1 Aug. 4, 2022

(51) Int. Cl.
G01N 15/08 (2006.01)
G01N 25/48 (2006.01)
B01D 53/14 (2006.01)
G01N 21/3504 (2014.01)

(52) U.S. Cl.
CPC ......... G01N 15/0806 (2013.01); B01D 53/14 (2013.01); G01N 21/3504 (2013.01); *G01N 2015/0846* (2013.01); *G01N 2021/3536* (2013.01)

(58) Field of Classification Search
CPC .... G01N 15/00; G01N 15/08; G01N 15/0806; G01N 21/35; G01N 21/3504; G01N 25/00; G01N 25/20; G01N 25/48; G01N 2015/0846; G01N 2021/3536; B01D 53/00; B01D 53/14
See application file for complete search history.

(56) References Cited

U.S. PATENT DOCUMENTS

| | | | |
|---|---|---|---|
| 5,187,084 A * | 2/1993 | Hallsby | B01L 7/52 435/303.1 |
| 5,942,432 A * | 8/1999 | Smith | B01L 7/52 435/303.1 |
| 8,629,401 B2 | 1/2014 | Kaskel et al. | |
| 2009/0071235 A1* | 3/2009 | Gross | G01N 7/02 73/73 |
| 2016/0340171 A1* | 11/2016 | Haaland | B67D 7/80 |
| 2020/0064288 A1* | 2/2020 | Cooper | G01N 15/088 |

OTHER PUBLICATIONS

Bao et al., "Adsorption of CO2 and CH4 on a magnesium-based metal organic framework," Journal of Colloid and Interface Science, 2011, 353(2):549-556.

(Continued)

*Primary Examiner* — Nguyen Q. Ha
(74) *Attorney, Agent, or Firm* — Fish & Richardson P.C.

(57) ABSTRACT

A system and method for high-throughput, high-resolution gas sorption screening are provided. An example system includes a sample chamber with a hermetic seal and a heat exchanger system. The heat exchanger system includes a heat exchanger disposed in the sample chamber, a coolant circulator fluidically coupled to the heat exchanger, and a sample plate comprising sample wells in contact with the cooling fluid from the coolant circulator. The system also includes a gas delivery system. The gas delivery system includes a gas source and a flow regulator. A temperature measurement system is configured to sense the temperature of the sample wells.

10 Claims, 14 Drawing Sheets

(56) References Cited

OTHER PUBLICATIONS

Bastos-Neto et al., "A theoretical and experimental study of charge and discharge cycles in a storage vessel for adsorbed natural gas," Adsorption, 2005, 11:147-157.

Cai et al., "General Motors: Final report for hydrogen storage engineering center of excellence," General Motors R&D Center, 2015, Warren, MI.

Canepa et al., "High-throughput screening of small-molecule adsorption in MOF," J. Mater. Chem. A, 2013, 1(43):13597-13604.

Cao et al., "Temperature dependence of the isosteric heat of adsorption," Adsorption Science & Technology, 2001, 19(10):887-894.

Cases et al., "MOF and UiO-67/MCM-41 adsorbents for pre-combustion CO2 capture by PSA: Breakthrough experiments and process design," Separation and Purification Technology, 2013, 112:34-48.

Chang et al., "Behavior and performance of adsorptive natural gas storage cylinders during discharge," Applied Thermal Engineering, 1996, 16(5):359-374.

Chung et al., "Computation-ready, experimental metal-organic frameworks: a tool to enable high-throughput screening of nanoporous crystals," Chem. Mater., 2014, 26(21):6185-6192.

Elsayed et al., "Development of MIL-101(Cr)/GrO composites for adsorption heat pump applications," Microporous and Mesoporous Materials, 2017, 244:180-191.

Fundamentals of heat and mass transfer, 6th ed., John Wiley & Sons, 2007, 1070 pages.

Hamon et al., "CO2 and CH4 separation by adsorption using Cu-BTC metal-organic framework," Ind. Eng. Chem. Res., 2010, 49(16):7497-7503.

Han et al., "High-throughput screening of metal-organic frameworks for CO2 separation," ACS Comb. Sci., 2012, 14(4):263-267.

Huang et al., "A general method for measuring the thermal conductivity of MOF crystals," International Journal of Heat and Mass Transfer, 2019, 138:11-16.

Kloutse et al., "Specific heat capacities of MOF-5, Cu-BTC, Fe-BTC, MOF-177 and MIL-53 (Al) over wide temperature ranges: Measurements and application of empirical group contribution method," Microporous and Mesoporous Materials, 2015, 217:1-5.

Li et al., "Recent advances in gas storage and separation using metal-organic frameworks," Materials Today, 2018, 31(2):108-121.

Liu et al., "CO2/H2O adsorption equilibrium and rates on metal-organic frameworks: HKUST-1 and Ni/DOBDC," Langmuir, 2010, 26(17):14301-14307.

Liu et al., "Heat capacities and thermodynamic properties of Cr-MIL-101," J. Therm. Anal. Calorim., 2017, 129:509-514.

Martin et al., "In silico design of porous polymer networks: high-throughput screening for methane storage materials," J. Am, Chem. Soc., 2014, 136(13):5006-5022.

Mason et al., "Application of a high-throughput analyzer in evaluating solid adsorbents for post-combustion carbon capture via multicomponent adsorption of CO2, N2, and H2O," J. Am. Chem. Soc., 2015, 137(14):4787-4803.

Mason et al., "Evaluating metal-organic frameworks for natural gas storage," Chem. Sci., 2014, 5(1):32-51.

Mason et al., "Evaluating metal-organic frameworks for post-combustion carbon dioxide capture via temperature swing adsorption," Energy & Environmental Science, 2011, 4(8):3030-3040.

Mota et al., "Dynamics of natural gas adsorption storage systems employing activated carbon," Carbon, 1997, 35(9):1259-1270.

Nguyen et al., "Understanding material characteristics through signature traits from helium pycnometry," Langmuir, 2019, 35(6):2115-2122.

Plaza et al, "Propylene/propane separation by vacuum swing adsorption using Cu-BTC spheres," Separation and Purification Technology, 2012, 90:109-119.

Qasem et al., "An efficient CO2 adsorptive storage using MOF-5 and MOF-177," Applied Energy, 2018, 210:317-326.

Qasem et al., "Energy and productivity efficient vacuum pressure swing adsorption process to separate CO2 from CO2/N2 mixture using Mg-MOF-74: A CFD simulation," Applied Energy, 2018, 209:190-202.

Saha et al., "Adsorption of CO2, CH4, N2O, and N2 on MOF-5, MOF-177, and Zeolite 5A," Environ. Sci. Technol., 2010, 44(5):1820-1826.

Sandra et al., "Speeding Up Chemisorption Analysis by Direct IR-Heat-Release Measurements (Infrasorp Technology): A Screening Alternative to Breakthrough Measurements," Industrial & Engineering Chemistry Research, 2015, 54:6677-6682.

Sayed et al., "Flow and heat transfer enhancement in tube heat exchangers," Heat and Mass Transfer, 2015, 51:1607-1630.

Sircar et al., "A semi-empirical adsorption equation for single component gas-solid equilibria," AIChE Journal, 1981, 27(5):806-812.

Sircar et al., "Why does the linear driving force model for adsorption kinetics work?," Adsorption, 2000, 6:137-147.

Uddin et al., "Specific heat capacities of carbon-based adsorbents for adsorption heat pump application," Applied Thermal Engineering, 2018, 129:117-126.

Wollmann et al., "High-throughput screening: speeding up porous materials discovery," Chem. Commun., 2011, 47(18):5151-5153.

Wollner et al., "Estimating pore size distributions of activated carbons via optical calorimetry," Adsorption, 2017, 23:313-320.

www.comsol.com [online], "COMSOL Multiphysics Reference Manual, version 5.4a," COMSOL, Inc, 2018, retrieved on Mar. 10, 2021, retrieved from URL <https://doc.comsol.com/5.4/doc/com.comsol.help.comsol/COMSOL_ProgrammingReferenceManual.pdf>, 866 pages.

Xiang et al., "Microporous metal-organic framework with potential for carbon dioxide capture at ambient conditions," Nature Communications, 2012, 3(954): 1-9.

* cited by examiner

HIGH THROUGHPUT HIGH RESOLUTION GAS SORPTION SCREENING

TECHNICAL FIELD

The present disclosure is directed to screening of sorbents for efficacy.

BACKGROUND

Porous materials, such as zeolites, metal-organic frameworks (MOFs), covalent-organic frameworks (COFs), and activated carbons are used in gas separation and storage applications. Fast high-throughput screening tools are needed to characterize and screen the sorption performance of a large number of these materials for particular applications. Such tools would allow for the exhaustive search for an optimized sorbent from a pool of thousands. Furthermore, high-throughput screening tools could improve materials discovery by allowing the development of structure-performance relationships.

Most high-throughput screening methods rely on computer simulations of the adsorption phenomenon. The accuracy of the computational methods depends on accurate knowledge of the structure of the adsorbents and the adsorbate-adsorbent interactions. In contrast, experimental screening methods would allow for the characterization of materials with unknown structures and surface chemistry. The success of developing a reliable laboratory high-throughput screening equipment depends on relating an easily measurable quantity, such as the sample's temperature or pressure, with the material's adsorption capacity.

SUMMARY

An embodiment described herein provides a system for screening sorbents. The system includes a sample chamber with a hermetic seal and a heat exchanger system. The heat exchanger system includes a heat exchanger disposed in the sample chamber, a coolant circulator fluidically coupled to the heat exchanger, and a sample plate comprising sample wells in contact with the cooling fluid from the coolant circulator. The system also includes a gas delivery system. The gas delivery system includes a gas source and a flow regulator. A temperature measurement system is configured to sense the temperature of the sample wells.

An embodiment described herein provides a system for screening sorbents. The system includes a sample chamber with a hermetic seal and a heat exchanger system. The heat exchanger system includes a heat exchanger disposed in the sample chamber, a coolant circulator fluidically coupled to the heat exchanger, and a sample plate comprising sample wells in contact with the cooling fluid from the coolant circulator. The system also includes a gas delivery system. The gas delivery system includes a gas source and a flow regulator. A temperature measurement system is configured to sense the temperature of the sample wells.

DETAILED DESCRIPTION

Methods and systems described herein provide a high-throughput screening technique that can assess the sorption performance of different classes of porous materials. The disclosed technologies link temperature changes, measured using an infrared camera, during the adsorption process with the materials' sorption uptake. A test gas is continuously fed to a test chamber at a controlled pressurization rate. The dissipation of heat generated by adsorption is controlled using a shell and tube heat exchanger-like configuration. The continuous flow of the test gas into the sample chamber enables the generation of high-resolution adsorption isotherms (HRI) allowing materials to be ranked at various operating conditions. Control of the heat dissipation rate permits the use of novel formulas that relate the amount of gas that sort at equilibrium with the observed temperature changes. The formulas are independent of the materials' thermo-physical properties allowing the testing and comparison of materials with different properties. Derivation of these formulas and their application to generate the FRI are described.

The apparatus design and screening methods account for variations in the thermal conductivity and heat capacity between the different sorbents in order to minimize their contribution to the apparent changes in temperature during the sorption process. The continuous flow of gas to the chamber in this design allows the determination of HRI in a shorter time than other techniques. Accordingly, the device's lower sensitivity to the isosteric heat of adsorption permits the development of a generalized method to screen different classes of materials with appreciable differences in their thermo-physical properties. Accordingly, the performance of different classes of porous materials such as MOFs, zeolites, and activated carbons can be screened simultaneously. The HRIs obtained allow for comparative studies at various operating conditions.

Figure 1:
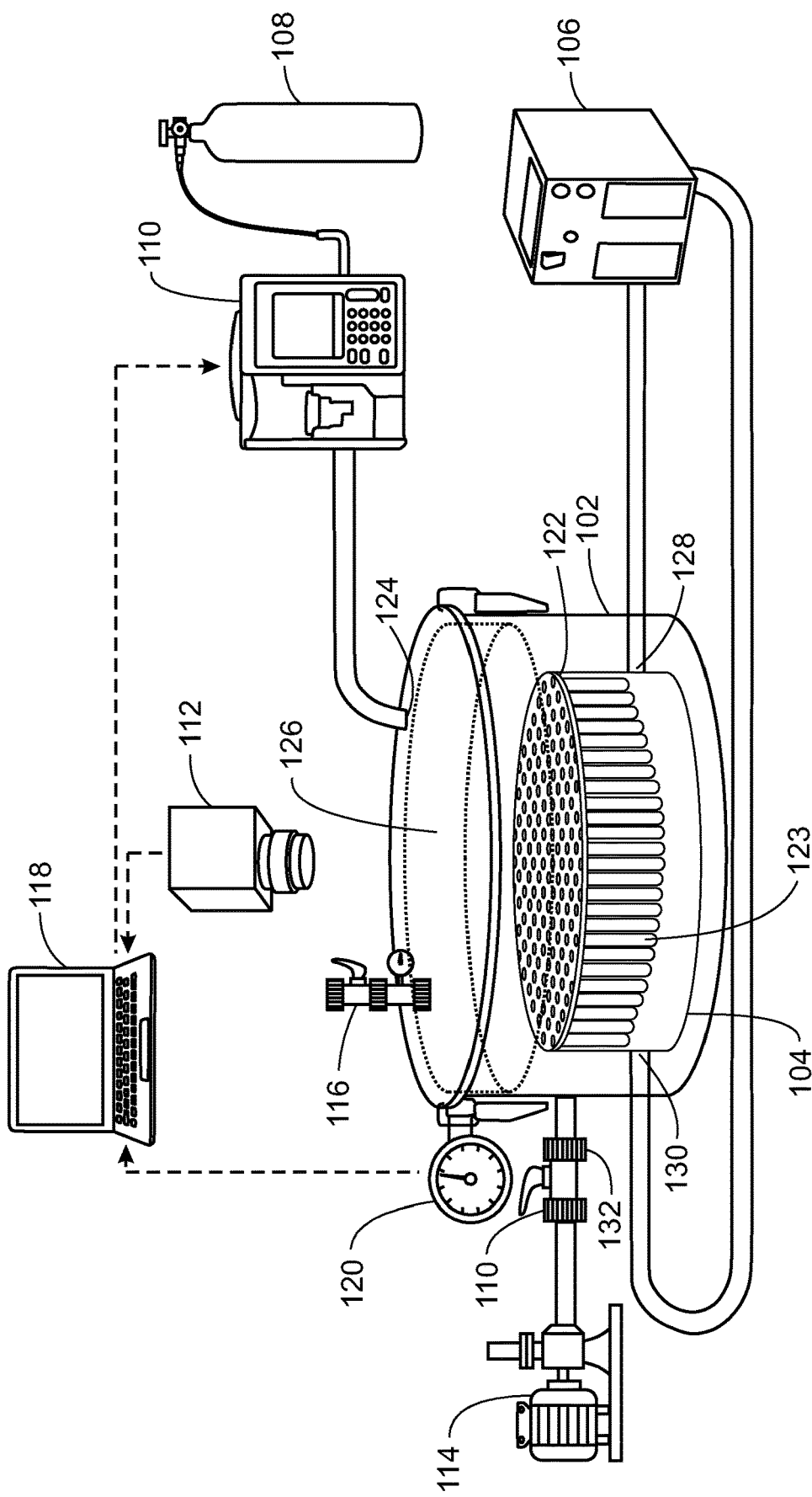
FIG. 1 is a schematic drawing of a system for high-throughput, high-resolution, gas sorption screening of sorbents.

FIG. 1 is a schematic drawing of a system 100 for high-throughput, high-resolution, gas sorption screening. The system proposed in this invention includes a sample chamber 102, which is designed to be hermetically sealed. A heat exchanger system is used to control the temperature of the samples, and includes a heat exchanger 104 and a coolant circulator 106. It can be noted that the coolant circulator 106 may be used to raise, lower, or hold the temperature of the heat exchanger 104. A gas delivery system provides the test gas or test gas mixture, and includes a gas source 108 and a flow controller 110. A temperature measurement system, such as an infrared camera is used to sense the temperature of the samples during adsorption. A pressure control system is used to pull a vacuum on the sample chamber 102 and to release pressure once the experiment is complete. The venting system includes a vacuum pump 114 and a vent valve 116. A control system 118, such as a personal computer or laboratory server, is used to monitor the temperature over time through the temperature monitoring system 112, control the gas flow through the flow controller 110, and monitor the pressure through a pressure sensor 120.

In one embodiment, the gas delivery system comprises a test gas cylinder as the gas source 108 connected to the flow controller 110, upstream the sample chamber 102. The flow controller 110 is calibrated to control the flow rate or the pressurization rate of the sample chamber 102. In another embodiment, a pressure controller, for example, as part of the flow controller 110 is used to control the pressurization rate. Gas sorption takes place in the heat exchanger 104, which is placed inside the sample chamber 102. The tubes are open from the top side, forming a sample plate 122, and are sealed from the bottom creating sample wells 123. The sample wells 123 should have a high aspect ratio to reduce thermal gradient in the axial direction, and a radius less than 2 mm to reduce the material thermal resistance and enhance heat dissipation. The wall thickness should be same for all sample wells 123 to account for its effect on the overall heat transfer coefficient. The candidate materials are loaded into the sample wells 123 being exposed from the top to the test gas. The heat generated by the adsorption is transferred to the cooling fluid flowing in the shell side of the heat exchanger 104. In the sample chamber 102, the test gas is introduced from the top through a nozzle 124 to enhance uniform distribution of the test gas. The sample chamber 102 is sealed to maintain the desired internal pressure and environment.

The sample chamber 102 can be made of any material that can withstand the operating conditions such as stainless steel, titanium, or ceramic, among others. The lid 126 of the sample chamber 102 is generally made from the same material as the sample chamber 102, and has an infrared-transparent window in the center, above which the temperature sensor 112 is mounted to monitor the temperature change of the sample wells 123 at known time intervals. As used herein, an infrared-transparent window will allow a subset of infrared light wavelengths to pass through at a sufficient level to allow the temperatures of sample wells 123 to be measured, for example, at a transmission of 30% or higher. In various embodiments, the infrared-transparent window is quartz or polycarbonate, among others. The wavelengths depend on the measurement and the window selected. For example, a quartz window may transmit infrared wavelengths between 0.2 μm and about 3.0 μm. A polycarbonate window may transmit infrared wavelengths between 0.5 μm and 1000 μm. In some embodiments, sufficient transmission, e.g., greater than about 30%, is achieved at wavelengths of interest, e.g., between about 1.5 μm and about 9 μm using a glass window, such as a chalconide infrared glass. Other materials, such as fiberglass, may be used in embodiments.

In some embodiments, the temperature sensor 112 is an infrared camera, such as a forward-looking infrared (FLIR) camera. The accuracy of the adsorption capacity estimate depends on the resolution of the temperature sensor 112, i.e. a high accuracy and a high temperature resolution is recommend. In some embodiments, the temperature sensor 112 collects data at 60 frames per second or higher. The speed of the data collection will dictate the resolution of the isotherm obtained for the adsorption.

The distance from the sample plate 122 to the temperature sensor 112 position is determined by the size of the sample plate 122, for example, using field-of-view calculators. The heat exchanger 104 is made of a conductive material, such as stainless steel, and may be coated with a dark opaque material to minimize back-reflection into the lens of the temperature sensor 112. The sampled materials are placed in the sample wells 123 of the sample plate 122. The sample wells 123 are arranged in the sample plate 122 in a staggered configuration to achieve a uniform temperature profile across the different sample wells 123 upon cooling. The cooling fluid is supplied from the coolant circulator 106 at a controlled rate and temperature. The cooling fluid is introduced into the heat exchanger 104 from nozzle 128 and exits from the adjacent nozzle 130. The diameter of the sample wells 123 is less than 2 mm to minimize the effects of thermal conductivity variations between the tested porous materials on the temperature change upon the adsorption and desorption process. In some embodiments, the sample wells 123 are about 30 mm in depth.

The sample chamber 102 is vented through the vent valve 116 to allow any materials from previous tests to escape, and allow the lid 126 to be removed. Once the sorbent samples are loaded into the sample wells 123 of the sample plate 122, a vacuum pump 114 is used to remove excess gases and adsorbed materials. During this period, the temperature of the samples may be raised to force any adsorbed materials from the sorbents.

During the test operations, temperature and pressure data is collected on the control system 118 at pre-defined time intervals, such as every 10 seconds, every 5 seconds, every second, or at shorter intervals, such as 30 frames per second, or 60 frames per second. In some embodiments, the control system 118 is used to automate administration of the test gas, the degassing step, and the operations of the vacuum pump 114, the coolant circulator 106, and the vent valve 116.

Device Operation Procedure

Sorbents to be screened and characterized for the subject test gas are loaded into the sample wells 123 of the sample plate 122. In some embodiments, some of the sample wells 123 are left empty to use as a reference for the temperature measurement. To evacuate the sample chamber 102 of any gases, the isolation valve 132 is opened and the vacuum pump 114 is operated overnight, or at least about 4 hours, at least about 8 hours, at least about 16 hours, or longer. The chamber pressure is held low, e.g., less than about 20 mm/Hg, or less than about 10 mm/Hg, or less than about 5 mm/Hg, or lower, to pull gas residues from the pores of the sample sorbents.

The heat management system is operated at the screening/characterization temperature of interest by introducing a temperature modifying fluid, or coolant, from the coolant circulator 106 through entry nozzle 128. After the temperature of the samples reaches the set point, the velocity of the working fluid is fixed and is maintained at the set value throughout the sorption experiment. Then, test gas is administered using at a fixed pressurization rate from the gas source 108. The pressurization rate should be small enough such that the increase in the sample's temperature is much smaller than the sample's initial temperature. Temperature and pressure are monitored using the temperature sensor 112 and pressure sensor 120, respectively. Data is recorded in the control system 118 periodically at known time intervals. Once the experiment is finish, the heat exchanger system is turned off and the vent valve 116 is opened to vent the test gas Screening Method To account for the different physical and thermal properties of the tested materials that limit the applicability of published screening methods, a novel screening method is outlined herewith. The screening procedure is based on exploiting the relationship between temperature increase during sorption processes and the adsorption capacity of tested materials. Unlike previous methods, the dependence of the observed temperature increase during the sorption process is derived from modeling of the transient non-isothermal adsorption dynamics of a particular sample well, i, within the device chamber shown in FIG. 1. Based on the derived relationship, conditions at which the sorption experiment shall be performed to estimate adsorption isotherms are described.

During gas sorption, the main physical processes that induce changes in the sample temperature are: 1) heat generated due to gas adsorption (or heat absorbed for endothermic chemisorption processes), 2) heat generated due to compression of free gas within the sample void, and 3) heat dissipation/ingress due to the thermal interaction between the sample and the temperature modifying fluid. Variations of the spatially averaged temperature within the sample well assuming that the free gas behaves as an ideal gas can be written as:

$$[(1-\epsilon)\rho_s^i C_{p_s}^i + \epsilon \rho_g C_{p_g}]\frac{d\Delta\langle T\rangle_i}{dt} = \Delta H^i \frac{d\langle n\rangle_i}{dt} + \epsilon \frac{dp}{dt} - \frac{U^i}{R}\Delta\langle T\rangle_i. \quad (4.1)$$

Here, p is the pressure inside the chamber and R is the radius of the sample wells 123. $\langle n \rangle_i$ is the average adsorbed amount in sample, i, per volume of the medium. $\Delta\langle T \rangle_i = \langle T \rangle_i - T_f$ where $\langle T \rangle_i$ is the average temperature of sample well i and $T_f$ is the temperature of the cooling fluid. All variables in brackets are volume averaged, i.e.

$$\langle x \rangle = \frac{1}{R^2 L}\int_0^R \int_0^L x dz r dr \text{ where } k_{eff}^i = [(1-\epsilon^i)k_s^i + \epsilon^i k_g]$$

L is the well depth. If the aspect ratio of the sample well, L/R, is much larger 1, thermal gradient in the axial direction can be ignored and thus $$\langle x \rangle = \frac{1}{R^2}\int_0^R xrdr \cdot \rho_s^i$$

is the particle density and $C_{P_s}^i$ is the material's specific heat capacity, respectively. $\Delta H^i$ is the isoteric heat of adsorption, which is assumed to be independent of coverage. $U^i$ is the overall heat transfer coefficient given by $$\frac{1}{U^i} = \frac{R}{2k_{eff}^i} + \frac{1}{h_f} + \frac{\lambda}{k_{wall}}.$$

Here, where $\epsilon^i$ is the porosity of sample i, and $k_s^i$ and $k_g$ are the thermal conductivity of the solid absorbent and the adsorbate molecules in the free gas phase, respectively. $\lambda$ is the wall thickness of the sample wells 123 and $h_f$ is the convective heat transfer coefficient of the cooling fluid that is mainly a function of the cooling fluid Reynolds and Prandtl numbers. For all interior samples within the staggered grid, variations in the value of $h_f$ is negligible. By varying the cooling fluid velocity, one can induce changes in the values of the heat transfer coefficient and as will be discussed next can allow for the measurement of the adsorbed amount without the need for identifying the specific heat capacity of the adsorbent materials. For instance, to achieve a value of $h_f$=75 W/(m²·K) using water as the coolant fluid requires an average flow rate of 20-100 μL/min for wells with a radius of 0.6 mm and sample separation distance of 1.5 to 3.6 mm. Finally, for endothermic chemisorption processes, the signs of the heat generation and the heat dissipation in Equation (4.5) are reversed.

A mass balance over the device's chamber yields:

$$V_{void}\frac{d\langle c\rangle}{dt} = f - 2\pi R^2 L \sum_{i=1}^{N} \frac{d\langle n\rangle_i}{dt}, \quad (4.2)$$

where $\langle c \rangle$ is the molar concentration of the introduced gas, $V_{void}$ is the void volume in the device accounting for the volume of the chamber and the voids between adsorbent particles and their pores. After loading all samples, the value of $V_{void}$ can be measured using a helium experiment typically used to determine the skeletal density of porous media. f is the molar flow rate to the device that is controlled by the flow controller 105 shown in FIG. 2.1. If the pressurization rate is controlled, Equation 4.2 can be used to calculate the flow rate to the chamber.

To complete the model, one needs an expression for the rate of adsorption, d$\langle$n$\rangle$ⁱ/dt. For most microporous materials, the adsorption rate is given by the linear driving force approximation:

$$\frac{d\langle n\rangle i}{dt} = k_0^i(\langle q\rangle_i - \langle n\rangle_i). \quad (4.3)$$

Here, $\langle q \rangle_i$ is the averaged adsorbed amount at equilibrium (adsorption isotherm) and $k_0^i$ is the mass transfer coefficient that is a function of all resistances for mass transfer from the gas phase to the pores inside the adsorbent particle. Finally, Equations 4.1-4.3 are subject to the following initial conditions: $\langle T \rangle(0)=T_i=T_f$, p(0)=0, $\langle q \rangle(0)$=0, and $\langle n \rangle(0)$=0. These conditions can be achieved by circulating the cooling fluid and vacuuming the sample chamber before introducing the gas.

If the sample interiors' Biot number, $B_{i_s} \equiv R_i\, h_f/k_{eff}^i \ll 1$, and the wall's Biot numbers, $b_{i_w} \equiv h_f \lambda/k_{wall} \ll 1$, the heat transfer coefficient is approximately equal to the convective heat transfer coefficient of the cooling fluid and is independent of the thermal conductivity of the adsorbent materials. Thus, the heat dissipation rate for all samples can be assumed to be uniform. The resistance of heat transfer within the sample wells 123 can be minimized by reducing their radii. For example, most MOF materials' thermal conductivity is in the range of 0.2-0.5 W/(m K). Thus, the well sample radius is set to be less than 2 mm, which is sufficient to ignore the thermal resistance of the adsorbents. Since the heat dissipation rate is uniform for all materials, changes in temperature in the different samples can be related to the heat of adsorption if one knows the values of the material's specific heat capacity. If such information is not known a priori, one can perform the adsorption experiment at the same temperature for different cooling fluid velocities and relate the adsorption rate to changes in the observed temperature. To derive such relation, Equation (4.1) is integrated over time to obtain:

$$[(1-\epsilon)\rho_s^i C_{p_s}^i + \epsilon \rho_g C_{p_g}]\Delta\langle T\rangle_i = -\frac{h_f}{R}\int_0^{t_f}\Delta\langle T\rangle_i dt + \Delta H^i \langle n\rangle_i + \epsilon p. \quad (4.4)$$

At low pressure, the adsorption isotherm can be linearized such that $$\langle q\rangle \approx \frac{\partial\langle q\rangle}{\partial T}\Delta\langle T\rangle + \frac{\partial\langle q\rangle}{\partial p}p, \text{ where } \frac{\partial\langle q\rangle}{\partial T} \text{ and } \frac{\partial\langle q\rangle}{\partial p}$$

are evaluated at the initial conditions. As the different adsorption isotherms, for most adsorbent materials, converge to 0 as p→0, one can argue that in the low-pressure regime, $$\left|\frac{\partial\langle q\rangle/\partial T}{\partial\langle q\rangle/\partial p}\frac{\Delta\langle T\rangle}{p}\right| \ll 1.$$

That is, the adsorbed amount, under low-pressure conditions, can be assumed to be independent of the system's temperature. A similar conclusion of negligible temperature variation effects on $\langle n\rangle_i$ can be drawn from Equation (4.3). Since the heat generated term, $\Delta H^i \langle n\rangle_i$ in Equation 4.4, is independent of temperature, it can be shown that:

$$\Delta H^i \langle n\rangle_i = \frac{1}{R}\left\{h_f^1 \int_0^p \frac{\Delta\langle T\rangle_{i_1}}{\left(\frac{dp}{dt}\right)}dp + \frac{\Delta\langle T\rangle_{i_1}}{\Delta\langle T\rangle_{i_2}(p_s) - \Delta\langle T\rangle_{i_2}(p_s)}\right. \quad (4.5)$$

$$\left.\left[h_f^2 \int_0^{p_2}\frac{\Delta\langle T\rangle_{i_2}}{\left(\frac{dp}{dt}\right)}dp - h_f^1 \int_0^{p_s}\frac{\Delta\langle T\rangle_{i_1}}{\left(\frac{dp}{dt}\right)}dp\right]\right\} - \epsilon p,$$

where the subscript in temperature indicates the experiment identification number. For example, $\Delta\langle T\rangle_{i_1}(p_s)$ is the temperature variation in experiment 1, i.e. using a fluid velocity such as the heat transfer coefficient is equal to $h_f^1$, evaluated at $p=p_s$. Here, $p_s$ is an arbitrary pressure value of choice and it should be small enough such that $$\left|\frac{\partial\langle n\rangle/\partial T}{\partial\langle n\rangle/\partial p}\frac{\Delta\langle T\rangle}{p}\right| \ll 1$$

still holds. For most adsorbents, a value of $p_s$ less than 1.0 bar is enough. The pressurization rate, dp/dt, can be calculated from the measured pressure profile. In another embodiment, the pressurization rate is controlled and is set throughout the experiment. The effective heat capacity of the sample, in Equation 4.4, is estimated by:

$$[(1-\epsilon)\rho_s^i C_{p_s}^i + \epsilon \rho_g C_{p_g}] = \frac{1}{\Delta\langle T\rangle_{i_1}(p_s) - \Delta\langle T\rangle_{i_2}(p_s)} \quad (4.6)$$

$$\frac{1}{R}\left[h_f^2\int_0^{p_2}\frac{\Delta\langle T\rangle_{i_2}}{\left(\frac{dp}{dt}\right)}dp - h_f^1\int_0^{p_s}\frac{\Delta\langle T\rangle_{i_1}}{\left(\frac{dp}{dt}\right)}dp\right].$$

To measure the mass transfer resistance of all adsorbents and thus evaluate the equilibrium adsorbed amount, $\langle q\rangle_i$, one can fit the asymptotic solution for $\langle n\rangle_i$ in the region where p→0. At low pressure, the adsorption isotherms of most materials is linear and thus $\langle q\rangle_i \approx C_i t$ where $C_i = (\partial\langle q\rangle dp)/(\partial p dt)$ and dp/dt is constant if the pressurization rate is set. If the flow rate is fixed instead, the pressure profile is linearized and the value of dp/dt, used to calculate $C_i$, is equal to the pressurization rate at the beginning of the experiment if the flow rate is fixed. Solving Equation (4.3), using this linear adsorption isotherm, yields:

$$\langle n\rangle_i = \frac{C_i}{k_0^i}\left[k_0^i t + e^{-k_0^i t} - 1\right]. \quad (4.7)$$

As t→0, one can linearize the exponential term and show that:

$$\Delta H^i \langle n\rangle_i = \frac{\Delta H^i C_i k_0^i}{2}t^2 - \frac{\Delta H^i C_i k_0^{i\,2}}{6}t^3 + O(t^4) = A_i t^2 - B_i t^3. \quad (4.8)$$

Thus, by fitting the values of $\Delta H^i \langle n\rangle_i$ obtained from Equation (4.5) with the polynomial described in Equation (4.8) for low-pressure data, the value of $$k_0^i = 3\frac{B_i}{A_u}$$

can be determined. From Equation (4.3), the adsorption isotherm is simply estimated as:

$$\Delta H^i \mid \langle q\rangle_i = \Delta H^i \frac{A_i}{3B_i}\frac{d\langle n\rangle_i}{dt} + \Delta H^i \langle n\rangle_i = \frac{A_i}{3B_i}e^{\frac{3B_i}{2A_i}t}\frac{d}{dt}\left[\Delta H^i \langle n\rangle_i e^{3\frac{B_{i_t}}{A_i}}\right]. \quad (4.9)$$

Finally, one can measure the heat of adsorption by performing a separate experiment at a different initial temperature and calculate the value of $\Delta H^i \langle q\rangle_i$. One way to estimate $\Delta H^i$ is to exploit the standard thermodynamic relation:

$$\Delta H^i = -\frac{R_g T^2}{p}\frac{\partial q_i/\partial T_i}{\partial q_i/\partial p}. \quad (4.10)$$

If the dependence of the isosteric heat of adsorption, $\Delta H^i$, on temperature and pressure is neglected, Equation 4.10 can be written as:

$$\Delta H^i = -\frac{R_g T^2}{p}\frac{\partial q_i/\partial T_t}{\partial q_i/\partial p}. \qquad (4.11)$$

Thus, one can directly use Equation 4.11 to estimate the heat of adsorption of tested materials when the values of $\Delta H^i q_i$ is estimated at different pressures and temperatures. Once the heat of adsorption is estimated, one can obtain high-resolution adsorption isotherms that can be used to rank adsorbents.

Figure 2:
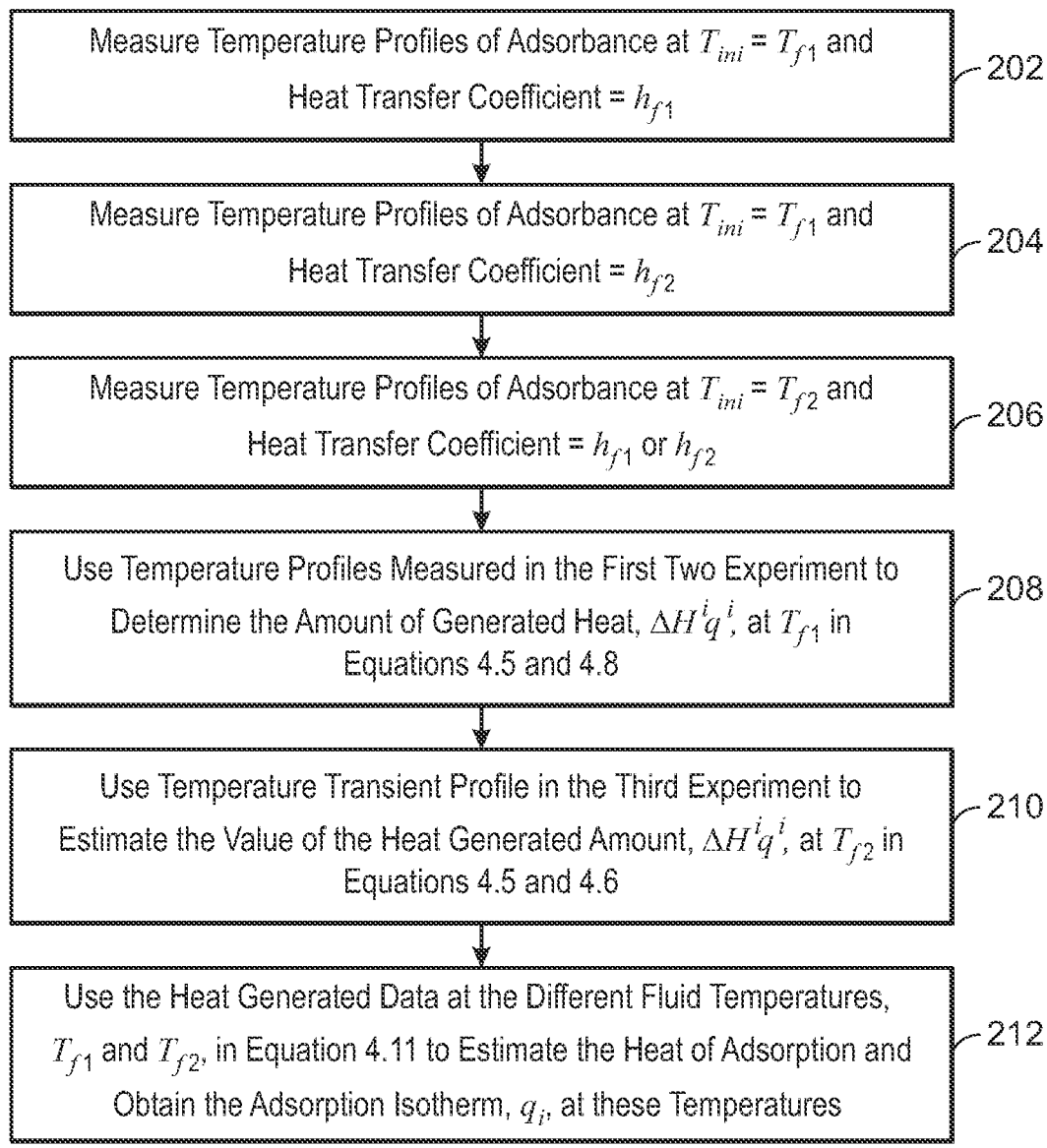
FIG. 2 is a flowchart of a method for using the apparatus to screen sorbents.

FIG. 2 is a flowchart of a method for using the apparatus to screen sorbents. In light of Equations 4.5, 4.8, and 4.11, the screening method 200 can be performed by following the experiment herein at three different conditions. At block 202, in the first experiment, the initial chamber temperature, $T_{ini}$, is set equal to the cooling fluid temperature set at $T_{f1}$ and the cooling fluid velocity is set at a particular value such that the value of the overall heat transfer coefficient of the device is equal to $h_{f1}$. At block 204, in the second experiment, the initial temperature is also set at $T_{f1}$, but the fluid velocity is changed such as the value of heat transfer coefficient is different from the first experiment and is equal to $h_{f2}$. At block 206, the third experiment is performed at a different initial temperature, that is equal to the fluid temperature $T_{f2}$, and the velocity of the cooling fluid is equal to that used in either the first or the second experiment. At block 208, the temperature profiles measured for all samples in the first two experiment is used to determine the amount of generated heat, $\Delta H^i q_i$, at $T_{f1}$ in Equations 4.5 and 4.8. At block 210, the temperature transient profile in the third experiment is used in Equations 4.5 and 4.6 to estimate the value of the heat generated amount, $\Delta H^i q_i$, at $T_{f2}$. At block 212, the heat generated data at the different fluid temperatures, $T_{f1}$ and $T_{f2}$, and Equation 4.11, is used to estimate the heat of adsorption and obtain the adsorption isotherm, $q_i$, at these temperatures.

EXAMPLES

Simulation of Experiments

The adsorption experiments were simulated using the COMSOL 5.4a package in comparison to experimentally verified adsorption equations.

Example: Screening Materials for Methane Adsorption

Figure 3A:
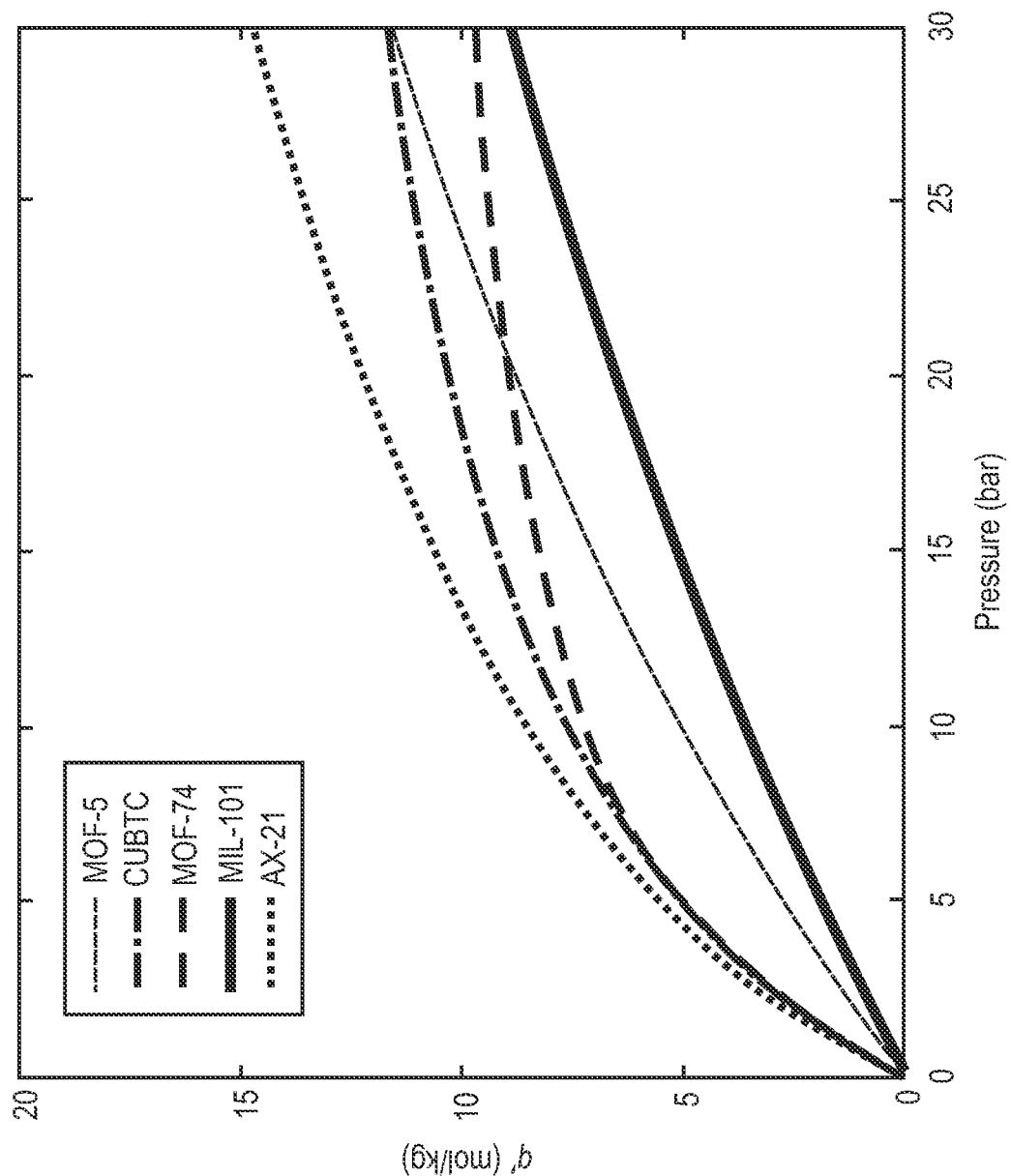
FIG. 3A is a plot of methane adsorption isotherms of a set of selected materials at 10° C.

FIG. 3A is a plot of methane adsorption isotherms of a set of selected materials at 10° C. In this experiment, $q'=q/(1-\in)$. In this example, the screening method is illustrated by estimating the methane adsorption capacity of different porous materials from modeled adsorption dynamics. To assess the accuracy of the method, the results are compared with the experimental adsorption isotherms. The experimental adsorption isotherms of these materials along with their thermal and physical properties are listed in Table A.1 in Appendix A. The temperature variation in a given sample well is modeled. The model neglects temperature variations and pressure drop along the axial direction. It assumes that heat transfer within the sample well is dominated by conduction through an effective solid medium. The gas phase is in thermal equilibrium with the solid adsorbent;

the temperature of the gas phase and the solid particles are assumed to be equal. Assumptions used in this model have been verified in other studies through simulating a three dimensional case of natural gas adsorption dynamics. Depending on the geometry of the adsorbent bed, different variants of the model are used to study the effects of non-isothermal adsorption dynamics in adsorbed gas storage applications.

When the thermal interference between the samples is ignored, due to their large separation distance, assumptions used in Chang and Talu model are applicable to the adsorption process that is taking place in the described device. These assumptions include ignoring the temperature gradient in the axial direction, since the aspect ratio of the sample well, L/R, is much larger than 1. Furthermore, temperature variations along the angular position are neglected due to radial symmetry. Therefore, an energy balance over any sample well volume yields a one dimensional equation:

$$[\rho_\varepsilon C_{p_s}(1-\epsilon) + \epsilon\rho_g C_{p_s}]\frac{\partial T}{\partial t} = k_{eff}\frac{1}{r}\frac{\partial}{\partial r}\left(r\frac{\partial T}{\partial r}\right) + \Delta H\frac{\partial n}{\partial t} + \epsilon\frac{\partial p}{\partial t}, \qquad 5.1$$

where $\in$ is the porosity of the sample well accounting for voids in between adsorbent particles and the intrinsic porosity of the adsorbent. $C_{pg}$ and $C_{ps}$ are the heat capacities of the gas and adsorbent, respectively. $\rho_g$ and $\rho_s$ are the density of the gas and adsorbent solid, respectively. $k_{eff}$ is the effective thermal conductivity defined as $k_{eff}=[(1-\in)k_s-\in k_g]$. $\Delta H$ is the isosteric heat of adsorption that depends on pressure and temperature. Convection heat transfer at the wall of the sample well is given by:

$$-k_{eff}\frac{\partial T}{\partial r} = h_f(T-T_f), \text{ at } r=R. \qquad 5.2a$$

Due to cylindrical symmetry, the other boundary condition can be written as:

$$\frac{\partial T}{\partial r} = 0, \text{ at } r=0. \qquad 5.2b$$

The adsorption rate term, $\partial n/\partial t$, is given by:

$$\frac{\partial n}{\partial t} = k_0(q-n). \qquad 5.3$$

Finally, pressure drop across the sample cell is neglected and thus solving a momentum balance is redundant. The mass conservation over the sample well is written as:

$$\epsilon\frac{\partial c}{\partial t} + \frac{\partial n}{\partial t} = \frac{K}{\mu r}\frac{\partial}{\partial r}\left(r\frac{\partial p}{\partial r}\right) + \dot{f}, \qquad 5.4$$

where c is the molar concentration of the free gas and for an ideal gas, it is given by $c=p/R_g T$ and f is the molar flow rate to the cell per volume of the medium. K is the permeability of the sample well and $\mu$ is the test gas viscosity. The no flux condition at the sample wall is required to solve Equation 5.4 and is given by:

$$\frac{\partial p}{\partial r} = 0, \text{ at } r = R. \quad\quad 5.5$$

In this example, the pressurization rate is controlled. Thus, Equation 5.4 is decoupled from the energy balance and is useful to determine the mass flow rate to the cell. Equations 5.1-5.5 are the general equations governing heat transfer within the sample wells 123. By specifying the functional form of the equilibrium adsorption isotherm, q, one can simulate the adsorption dynamics as methane is introduced to the cell. The functional form the adsorption isotherms of the tested materials are listed in Table A.1.

Figure 3B:
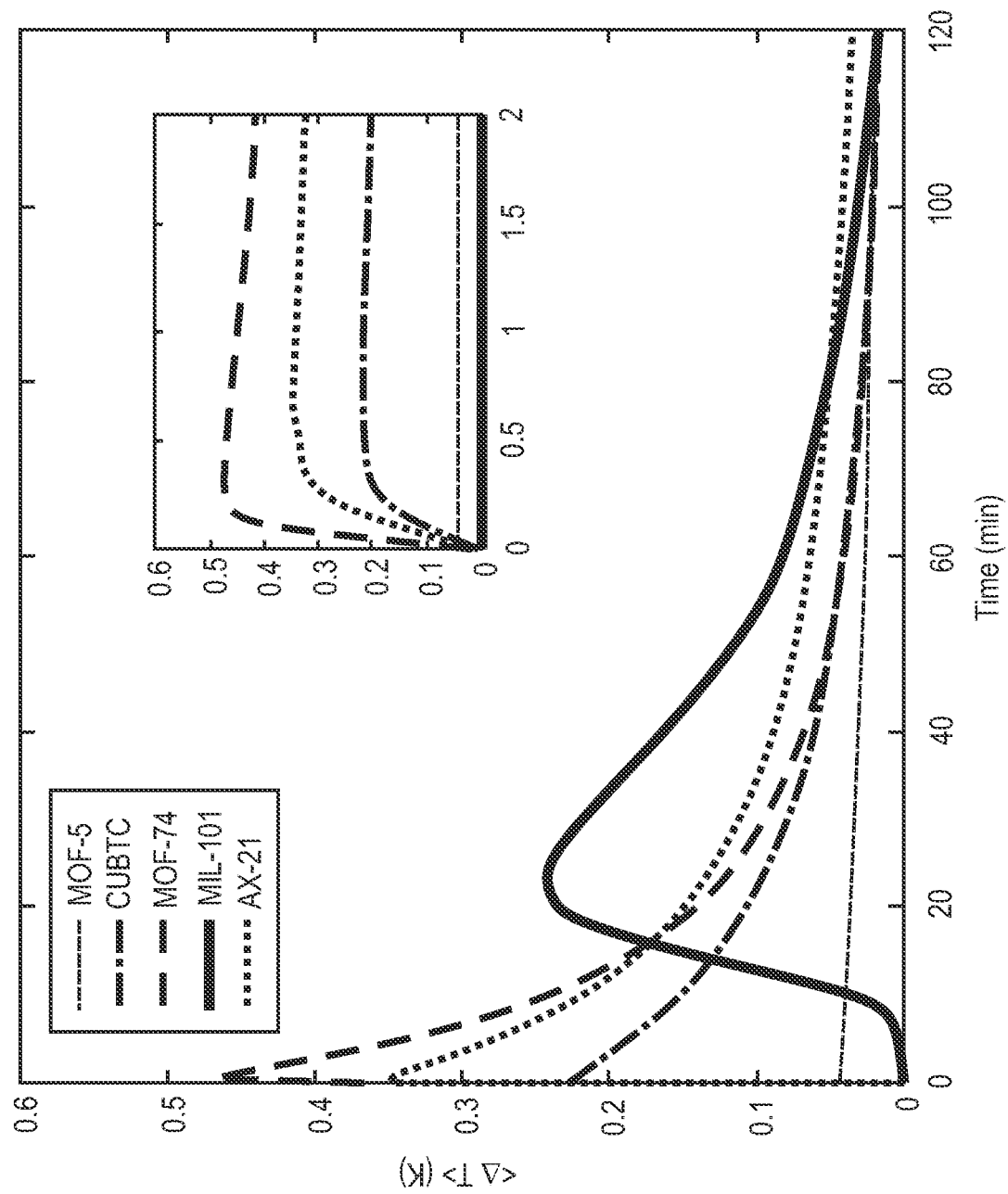
FIG. 3B is a plot of the transient temperature profile of the selected materials for simulation case I.

FIG. 3B is a plot of the transient temperature profile of the selected materials for simulation case I. In this example, methane is introduced to the sample cell and the pressurization rate is controlled at $\partial p/\partial t = 274$ Pa s$^{-1}$. The radius of the sample wells 123 is set to be 0.6 mm to minimize the effects of heat transfer resistance of the adsorbent materials. As can be seen in FIG. 3B, the methane adsorption capacity of MOF-5 is lower than that of MOF-74 but becomes higher at a higher pressure. Such crossover in the relative adsorption capacity is hard to detect when generating low-resolution adsorption isotherms.

Figure 4A:
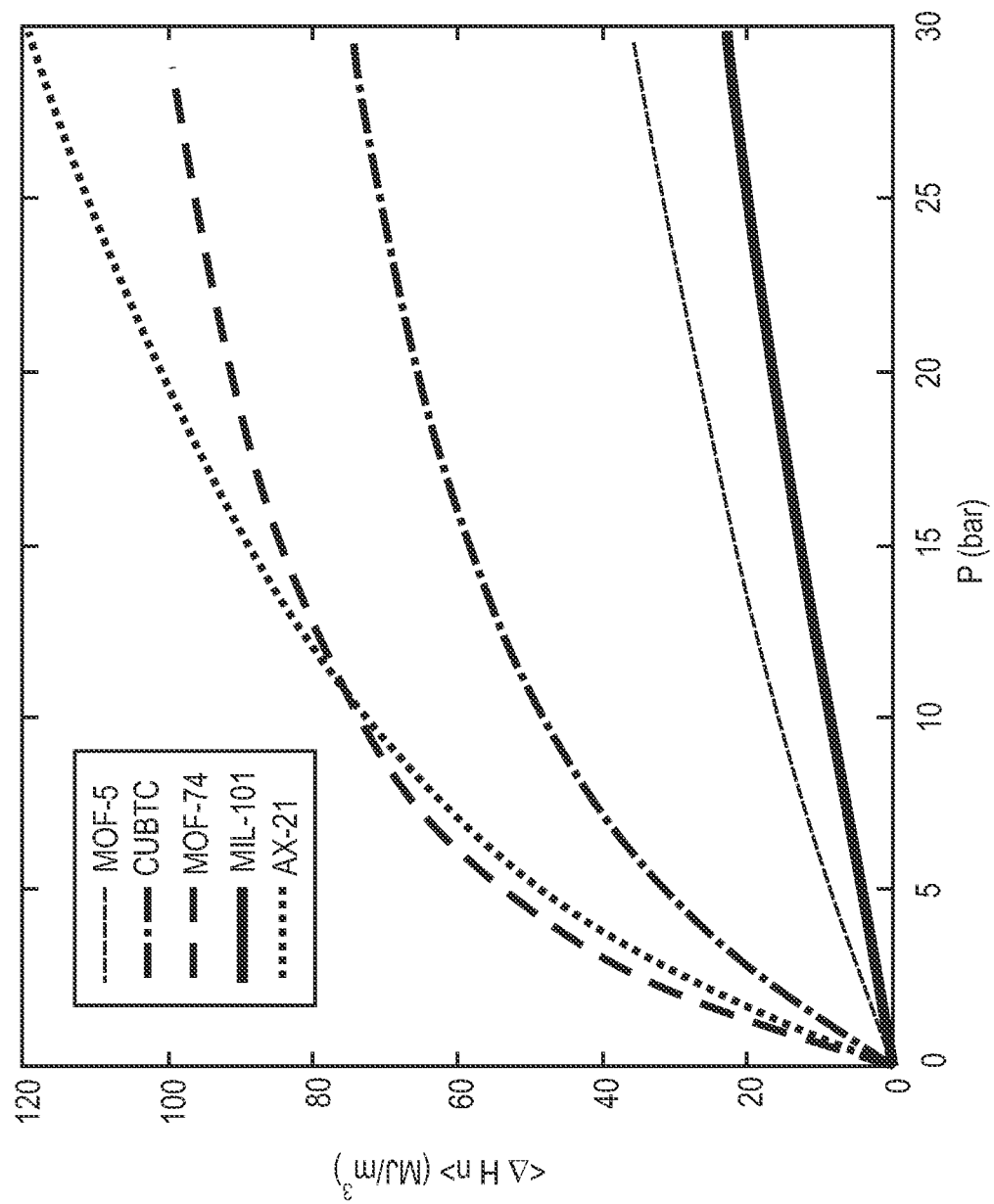
FIG. 4A is a plot of the generated heat profile when the adsorption experiment is performed using a cooling fluid with a temperature of 10° C.

FIG. 4A is a plot of the generated heat profile when the adsorption experiment is performed using a cooling fluid with a temperature of 10° C. Using Equations 5.1-5.4, the adsorption dynamics of $CH_4$ in these materials was simulated using the COMSOL 5.4a package at three different conditions. Table 5.1 summarizes the parameters used in the simulation.

Even though the adsorption capacity of MOF-74, CUBTC, and AX-21 is similar at low pressures, they exhibit different temperature increases early in the adsorption process. Thus, material ranking cannot not be based on direct comparison of observed temperature profiles. Furthermore, temperature increase for some materials may be lower than the detection resolution of the used infrared camera. It is advisable to use a low enough fluid velocity such that a temperature increase in all porous materials can be detected while maintaining an overall temperature increase of most materials that is much smaller than the cooling fluid temperature. Finally, the observed delay in the peak of the temperature of material MIL-101 is due to the significantly lower thermal conductivity of this material compared to others. The conductivity of MIL-101 is equal to 0.05 W/m K while the conductivity of the other materials is of the order of 0.3 W/m K. Since the thermal resistance of MIL-101 is significant, inaccuracies in the estimate of the adsorption isotherm may arise. To avoid such inaccuracies, the radii of the sample wells 123 can be decreased.

TABLE 5.1

Simulation conditions used to simulate the adsorption dynamics of the materials described in Table A.1

| Simulation: I | Simulation: II | Simulation: III |
|---|---|---|
| T(0) = Tfl = 10° C. | T(0) = Tfl = 10° C. | T(0) = Tfl = 25° C. |
| hfl = 50 W/(m2 K) | hfl = 100 W/(m2 K) | hfl = 50 W/(m2 K) |

Figure 4B:
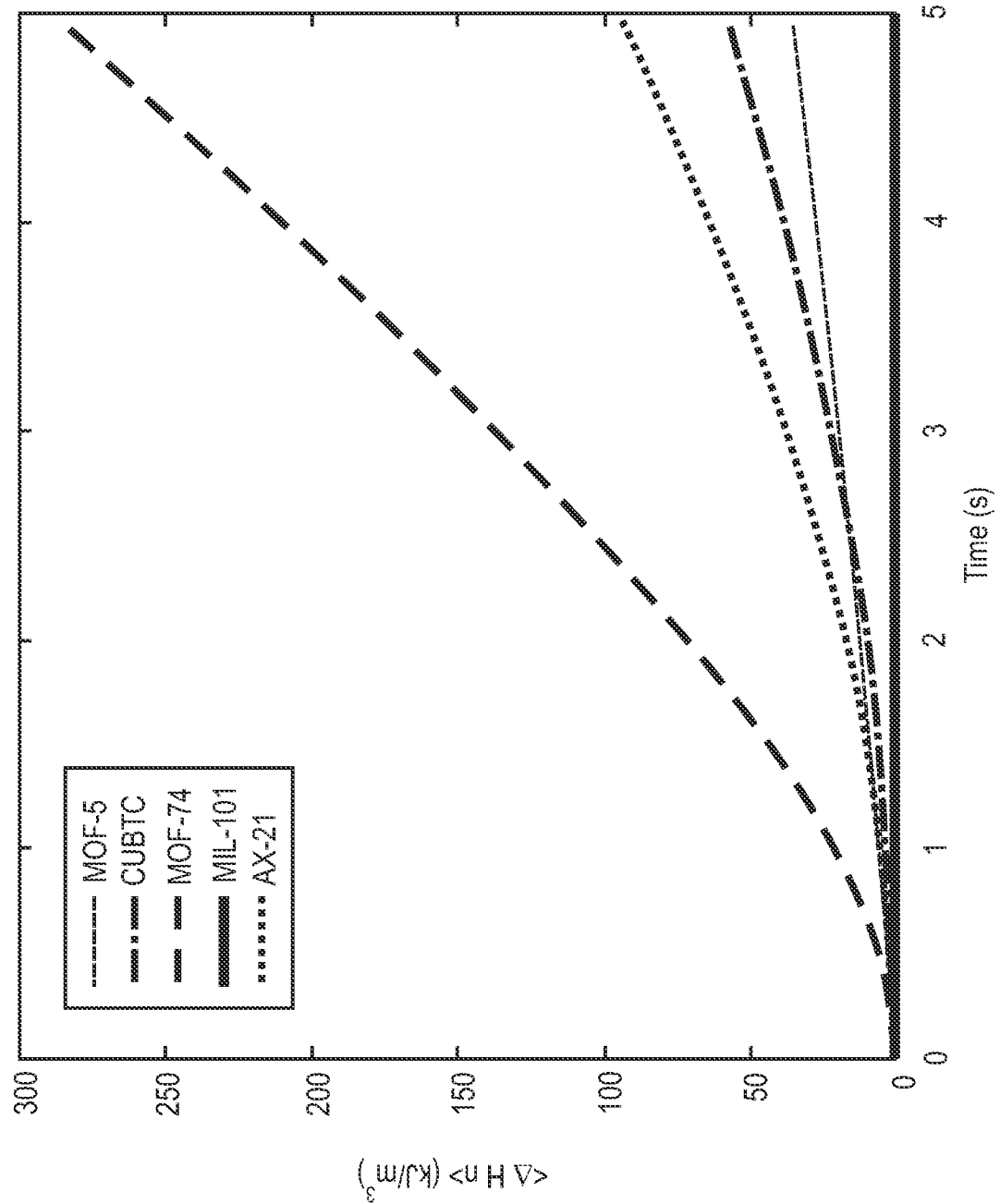
FIG. 4B is a plot of the calculated value of the generated heat of adsorption of the selected materials over time.

R = 0.6 mm
kg = 0.03 W/m K
$\partial p/\partial t$ = 274 Pa s$^{-1}$ C.
pg = 2.23 kJ/kg K FIG. 4B is a plot of the calculated value of the generated heat of adsorption of the selected materials over time. Following the screening method described herein, the temperature profiles from cases I and II are used to calculate the effective heat capacity, given by Equation 4.6, and thus estimating the generated heat, $\Delta H\langle n\rangle$, of the samples for simulation cases I and III. To calculate the mass transfer coefficient, $k_0$, of all samples, data of the generated heat, at early times, shown in FIG. 4B, are fitted using Equation 4.8. Once the mass transfer coefficient of a given sample is determined, the volumetric heat of adsorption (i.e. per volume of the adsorbent), $\Delta H\langle q\rangle$, can be directly calculated using Equation 4.9. Using Equation 4.11 and data of $\Delta H\langle q\rangle$ at 10° C. and 25° C., the isosteric heat of adsorption, $\Delta H$, is calculated as a function of the volumetric heat of adsorption.

Figure 5:
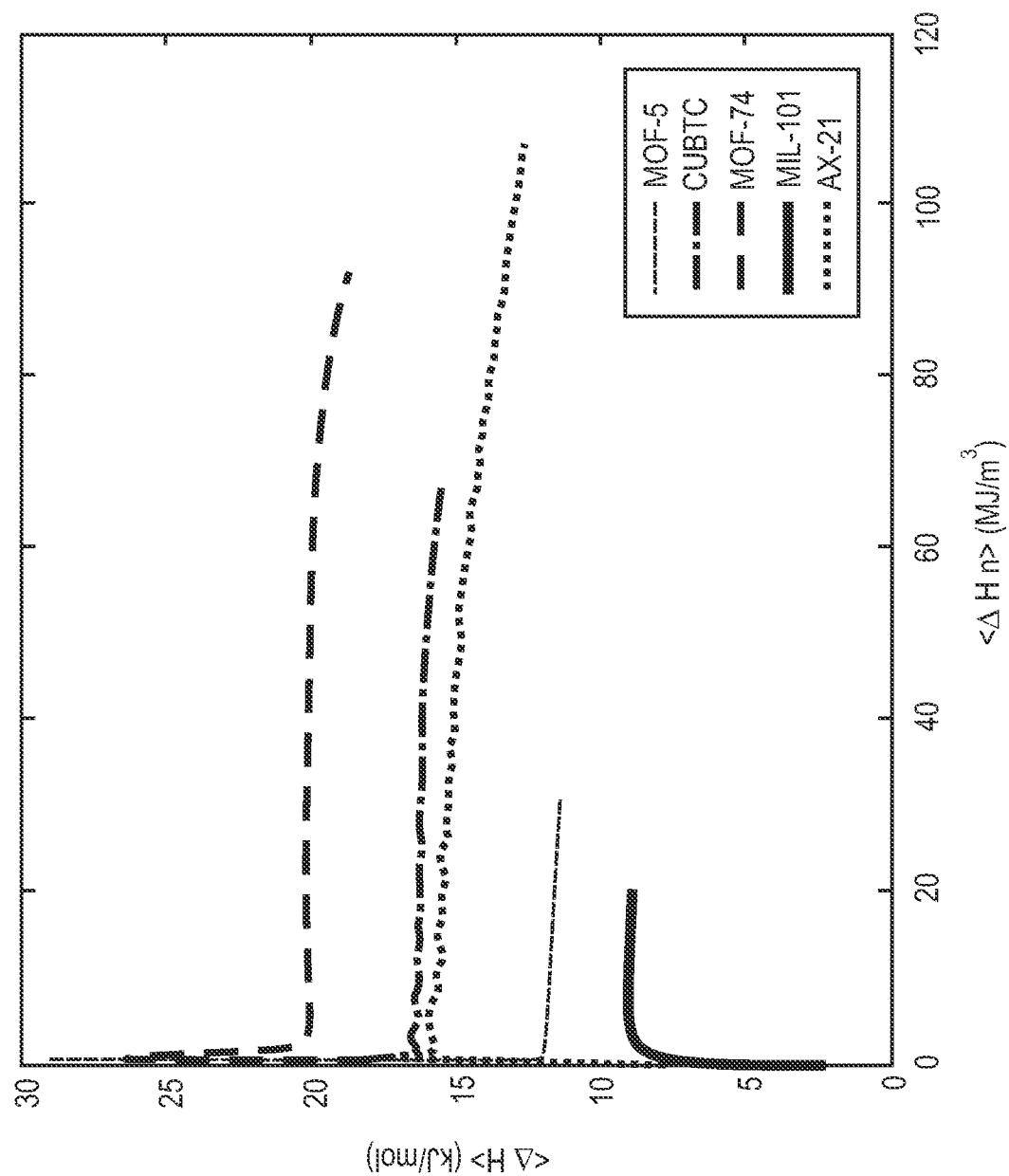
FIG. 5 is a plot of the calculated heat of adsorption of the selected materials using Equation 5.11.

FIG. 5 is a plot of the calculated heat of adsorption of the selected materials using Equation 5.11. As shown in FIG. 5, the assumption of constant heat of adsorption is violated in the low and high-pressure regimes. Therefore, an average value in the medium pressure region where the heat of adsorption does not vary much is used.

Figure 6A:
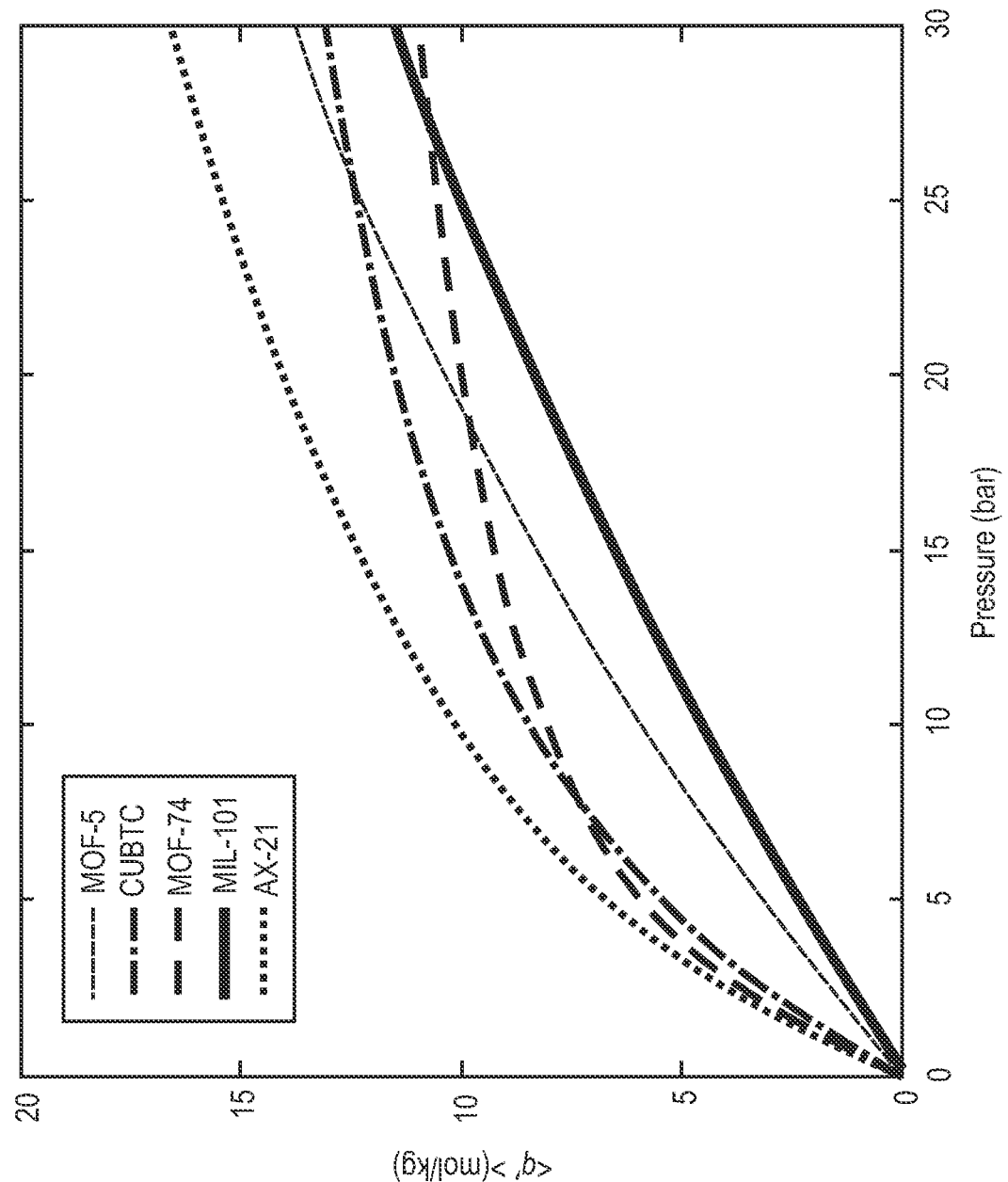
FIGS. 6A and 6B are plots of estimated adsorption isotherms for the selected materials and a comparison with actual values.
Figure 6B:
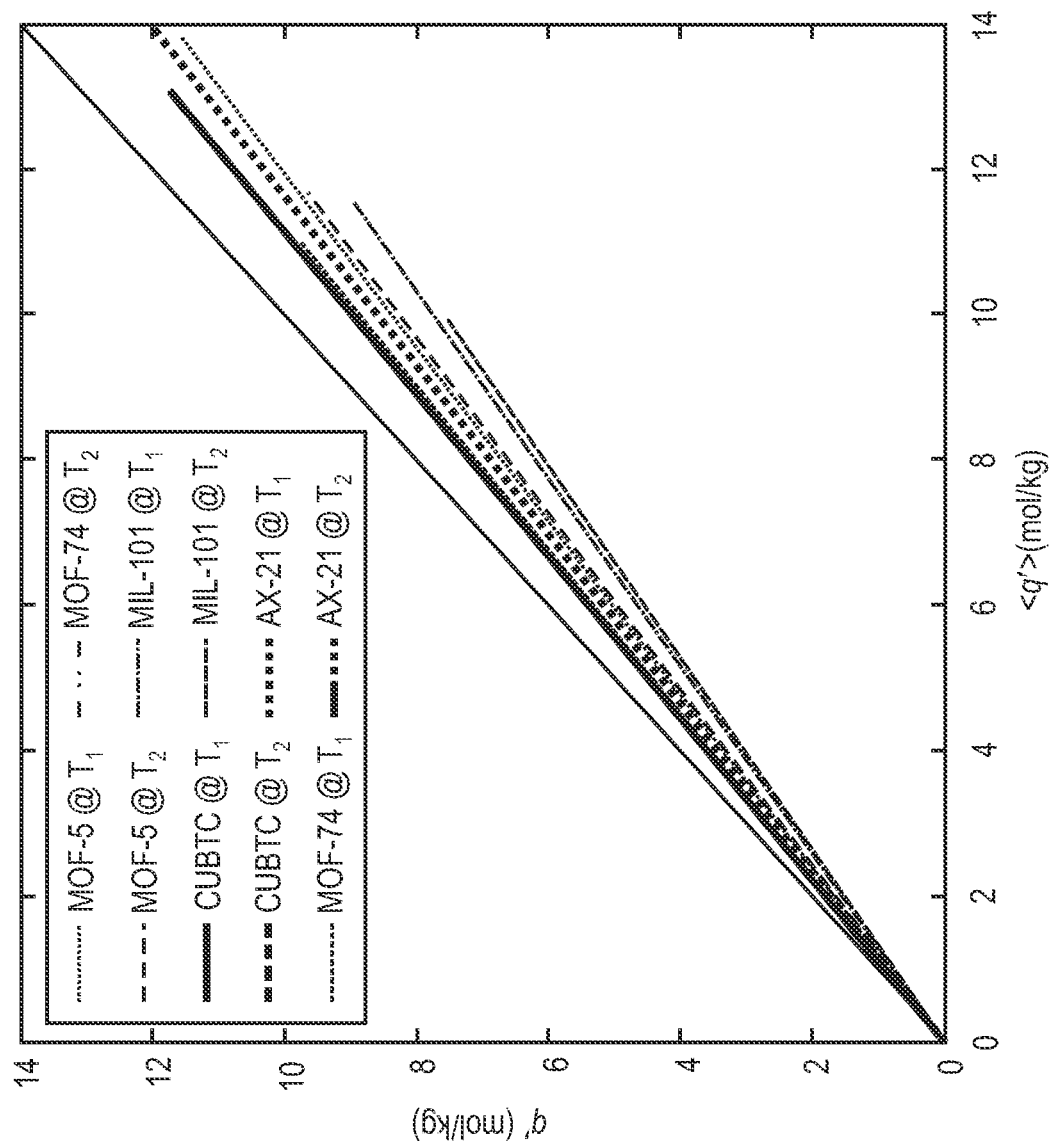

FIGS. 6A and 6B are plots of estimated adsorption isotherms for the selected materials and a comparison with actual values. Once the heat of adsorption is determined, high-resolution adsorption isotherms are generated as shown in FIG. 6A, which shows the measured adsorption isotherms at 10° C. The crossover between the adsorption capacity of MOF-5 and MOF-74 at high pressure is retrieved. To assess the accuracy of the screening method presented in this invention, the estimated adsorption amount, (q), is directly compared with the experimental values modeled using the isotherms presented in Table A.1. FIG. 6B shows a comparison between the estimated and actual adsorbed amount at T1=10° C. and T2=25° C. The solid black line is a 45-degree line that one would get if the estimated adsorbed amount is exactly equal to that presented in Table A.1. FIG. 6B indicates that the presented screening method is very accurate at low pressures but consistently underestimates the adsorption capacity at high pressures. The errors introduced in estimating the adsorption amount is very sensitive to the calculations of the heat of adsorption. For screening purposes, such errors are tolerable as one is only interested in the relative adsorption capacity between different samples at different pressures. Moreover, errors in estimating the adsorption capacity of MIL-101 are the largest amongst simulated materials. This is due to the anomalously higher resistance for heat transfer such that the Biot number of the sample interior is equal to 4 while derivations for Equation 4.5 assume that the value of Bi<<1.

Figure 7:
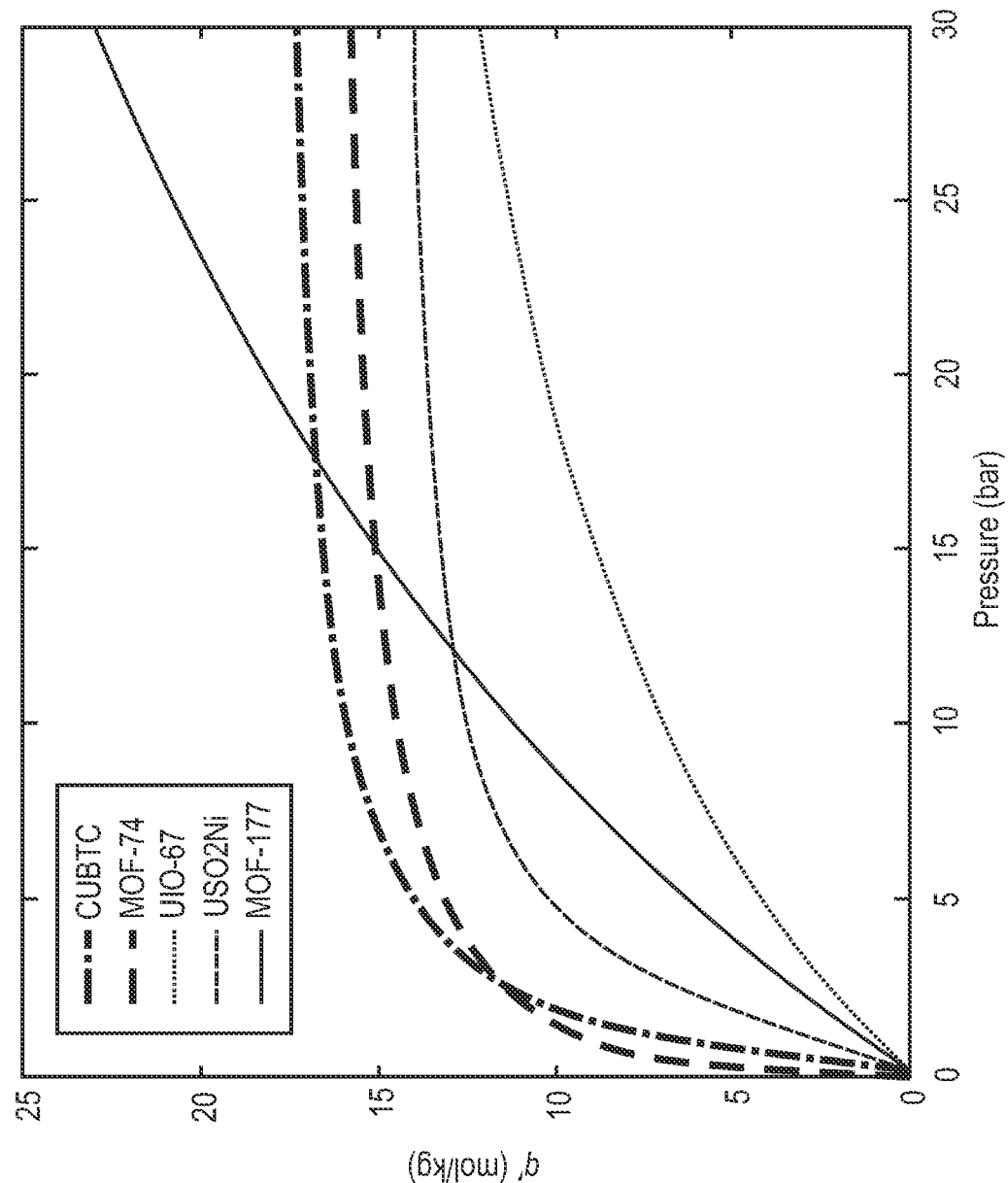
FIG. 7 is a plot of model adsorption isotherms of the selected materials.

FIG. 7 is a plot of model adsorption isotherms of the selected materials. The modelling was performed at 10° C. using equations listed in Table A.2. In the model, $q' = q/(p_s(1-\varepsilon))$.

Example: Screening Materials for Carbon Dioxide Adsorption

Figure 8:
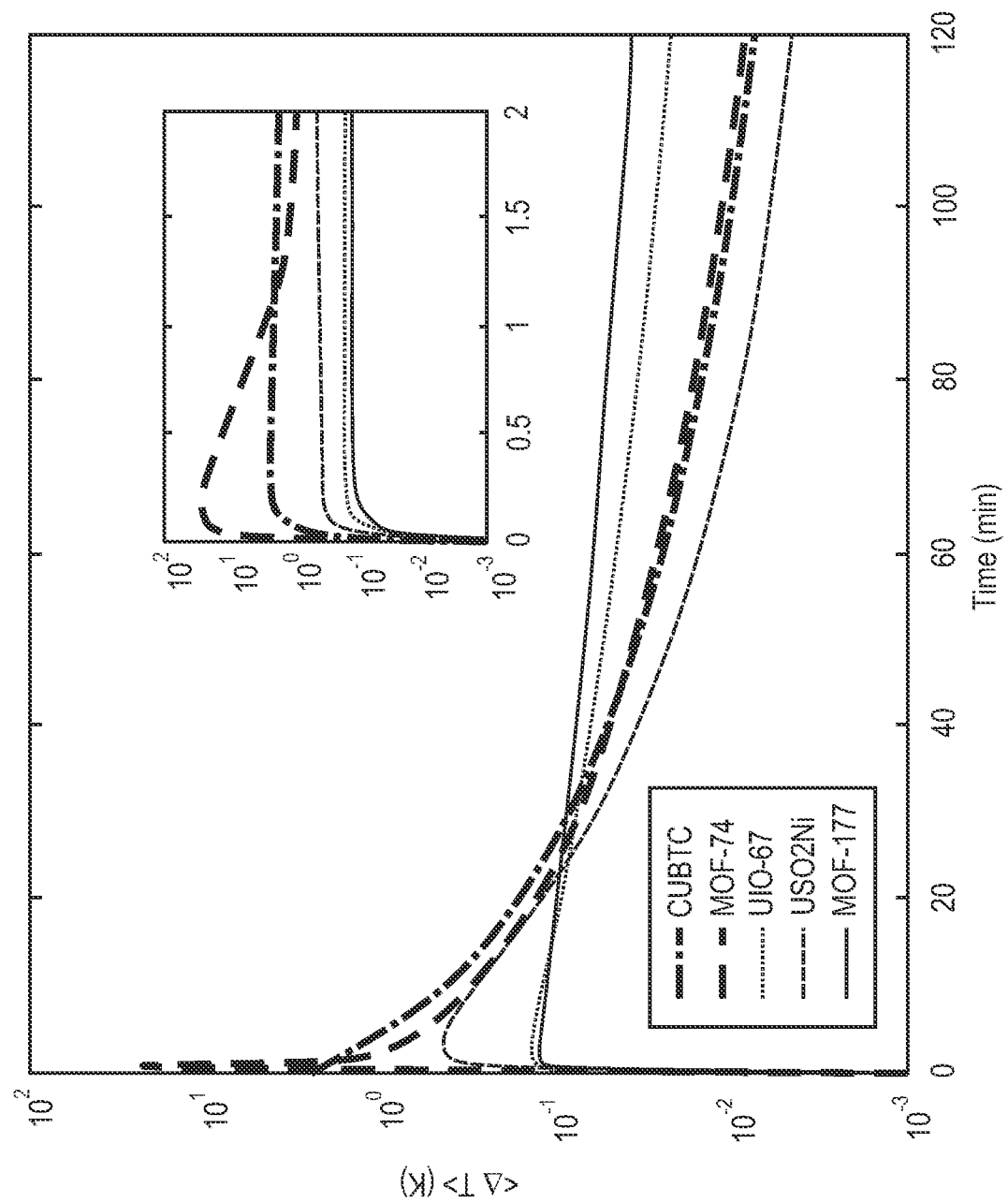
FIG. 8 is a plot of temperature profiles during adsorption of $CO_2$.

FIG. 8 is a plot of temperature profiles during adsorption of $CO_2$. The results shown are for simulation case I. Similar to the previous example, $CO_2$ adsorption dynamics can be simulated by specifying the functional form of the equilibrium adsorption isotherm, q, and other intrinsic physical and thermal properties of the material (Table A.2). The parameters for the simulation cases are the same as those listed Table 5.1. The thermal properties of $CO_2$ used in the simulation are Cpg=0.9 kJ/kg K and kg=0.017 W/m K. As shown in FIG. 8, differences in the isotherm types and shapes, e.g., adsorption rate, saturation pressure, and saturation capacity, again confirm the need for high-throughput methods that provide HRIs for one to unambiguously screen and rank the adsorption capacity of the selected sorbent materials.

As shown in FIG. 8, while MOF-74 does not possess the highest adsorption capacity of the selected materials (FIG. 7), its temperature peak is an order of magnitude higher than the other materials due to the steep adsorption isotherm at low pressure (i.e. high dq/dp) and the relatively high heat of adsorption (Table A-2). Following the same procedure outlined in the previous section, the heat of adsorption, $\Delta H$, was calculated and plotted in FIG. 9.

Figure 9:
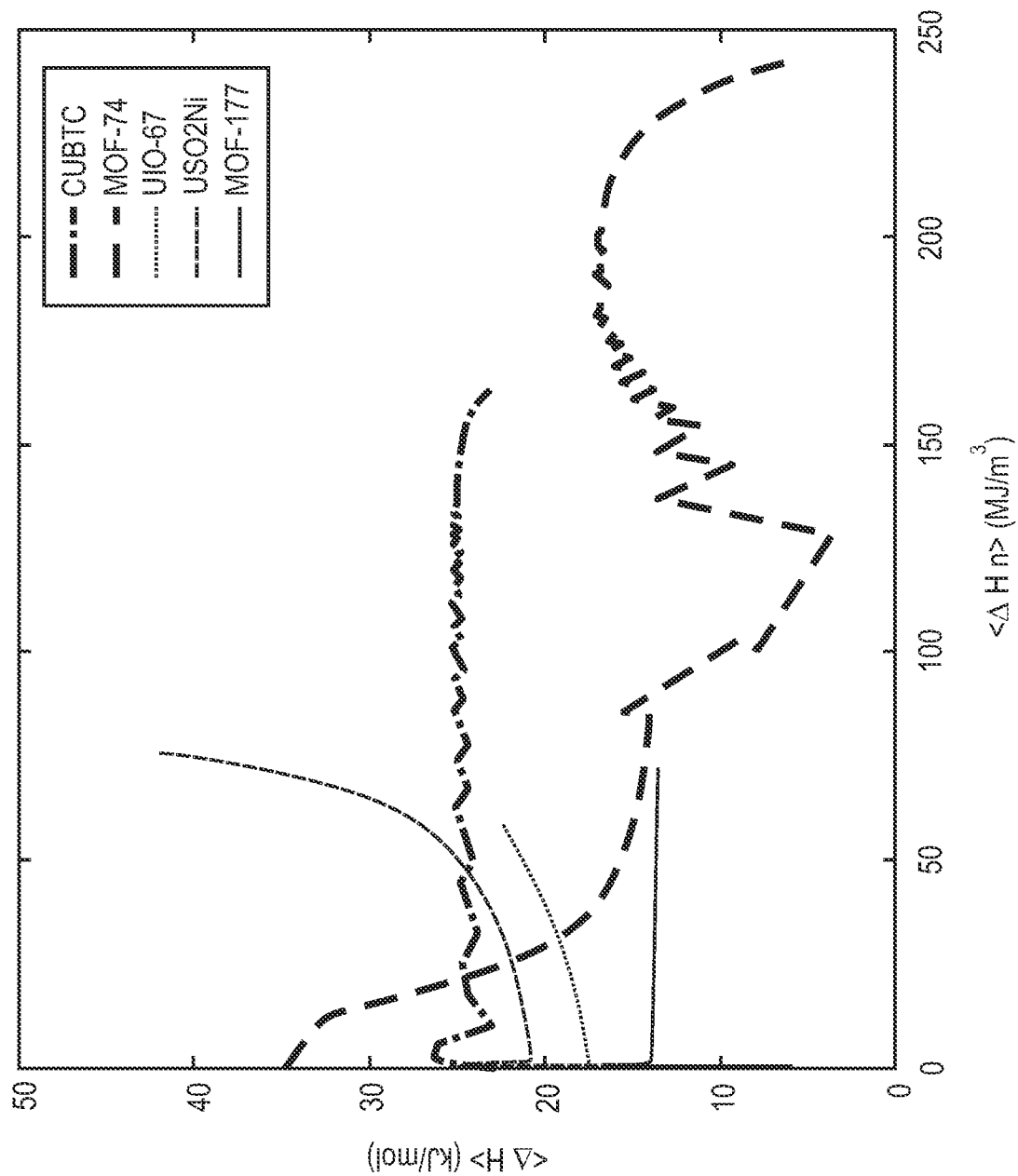
FIG. 9 is a plot of temperature profiles during adsorption of $CO_2$.

FIG. 9 is a plot of the estimated heats of adsorption of $CO_2$ for the selected materials. As shown in FIG. 9, the assumption of constant heat of adsorption is violated at low and high-pressure regimes. Therefore, an average value in the medium pressure regime where the heat of adsorption is largely constant was used.

Figure 10A:
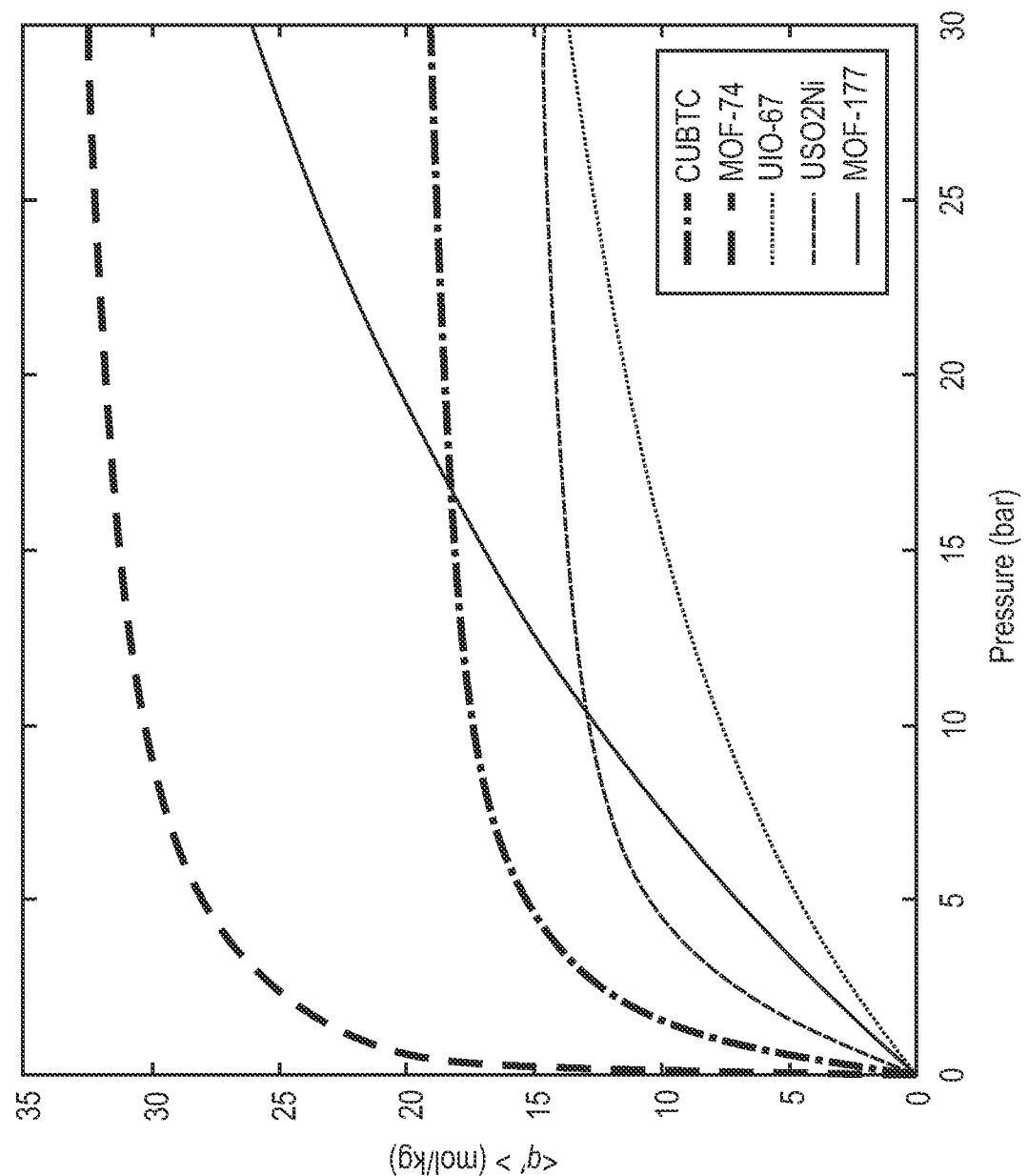
FIGS. 10A and 10B are plots of the estimated adsorption isotherms for selected materials and their comparisons with actual values.
Figure 10B:
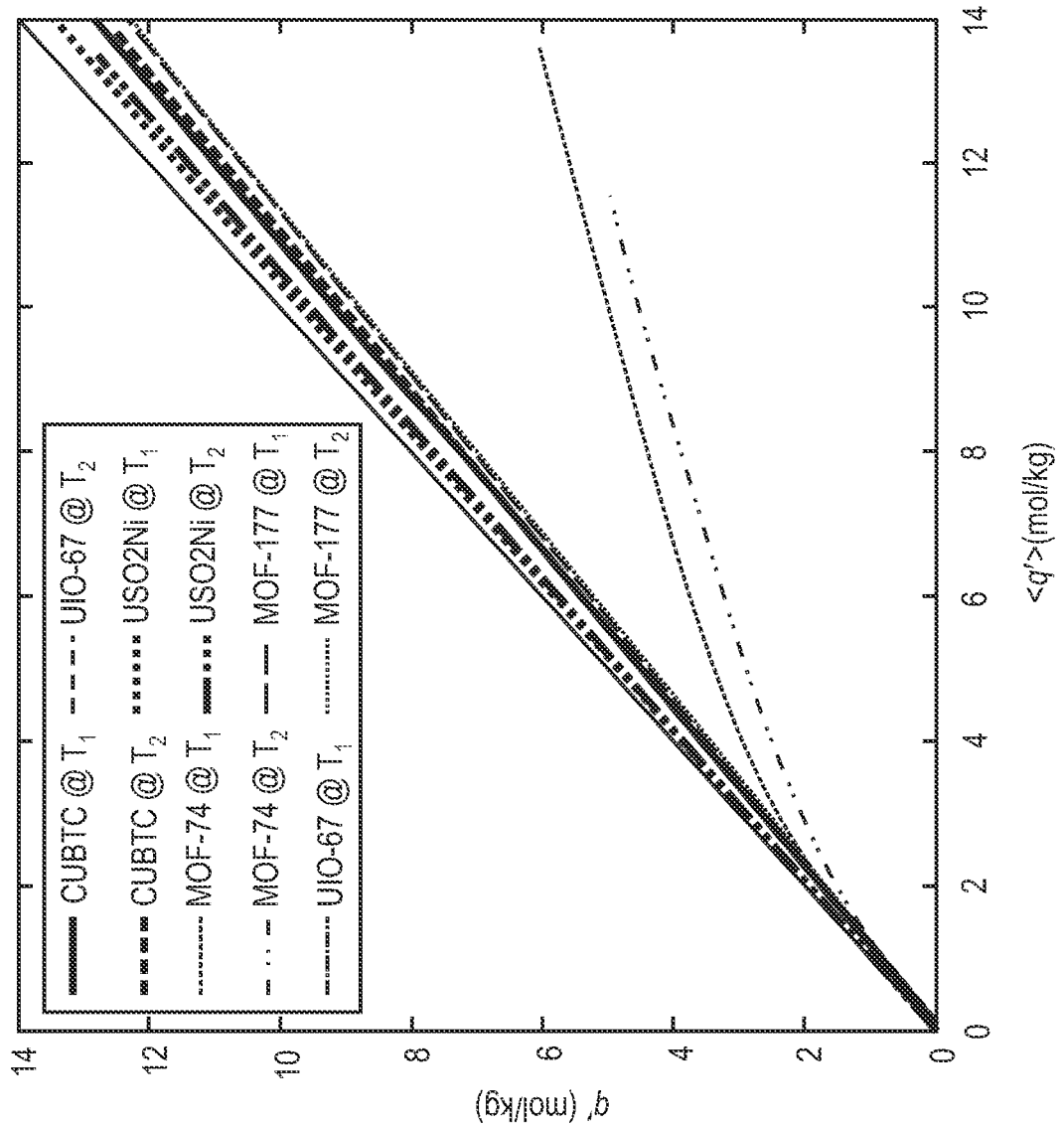

FIGS. 10A and 10B are plots of the estimated adsorption isotherms for selected materials and their comparisons with actual values. Once the heat of adsorption is determined, the high-resolution adsorption isotherms are generated as shown in FIG. 10A. Except for MOF-74, the crossover between the adsorption capacity of MOF-177, CUBTC, and USO2Ni at high pressure is retrieved. MOF-74 surface heterogeneity introduce large variations in the estimated isostatic heat of adsorption $\langle \Delta H \rangle$ obtained from the $\langle \Delta H n \rangle$ isotherm rendering the constant $\Delta H$ assumption and hence the method of calculating $\Delta H$ (Equation (4.11)) invalid to estimate the adsorption capacity, $\langle q \rangle$ at high pressure. To assess the accuracy of the screening method presented in this invention, the estimated adsorption amount, $\langle q \rangle$, is directly compared with the experimental values modeled using the isotherms presented in Table A-2.

FIG. 10B shows the estimated and actual adsorbed amount at different pressure and temperature. The solid black line is a 45-degree line that one would get if the estimated adsorbed amount were exactly equal to that presented in Table A-2. FIG. 10B indicates that the presented screening method is very accurate at low pressures but consistently underestimates the adsorption capacity at high pressures. The errors introduced in estimating the adsorption amount is very sensitive to the calculations of the heat of adsorption.

As mentioned previously, the adsorption capacity of MOF-74 deviates significantly from the experimental values due to the large variations of $\Delta H$ because of the significant surface heterogeneity of the material. One may consider detailed analysis of materials that show significant deviation from the constant $\Delta H$ assumption when estimating the equilibrium adsorption isotherm. For screening purposes, such errors are tolerable as one is interested in the relative adsorption capacity between different samples at different pressures but not the actual.

Physical properties of sorbents used in Examples 1 and 2.

Table A.1 lists the physical properties of the sorbents used to simulate methane adsorption while Table A.2 lists the physical properties used to simulate $CO_2$ adsorption. Parameters that were not found in the literature were estimated. The estimated properties did not change the performed assessment.

TABLE A.1

$CH_4$ adsorption isotherms and sorbents intrinsic properties

| | Isotherm | Parameter value | |
|---|---|---|---|
| CUBTC<br>Linker: benzene-<br>1,3,5-tricarboxylate<br>Metal: Cupper | $\frac{q}{\rho_s q_m} = \frac{bP}{bP+1}$<br><br>$b = b_0 e^{\frac{\Delta H}{R_g T}}$ | $q_m = 15.9$ (mol/kg)<br>$b_0 = 0.834$ (GPa$^{-1}$)<br>$\Delta H = 16.55$ (kJ/mol)<br>$k_0 = 0.15$ (s$^{-1}$)* | $\rho_s = 703$ (kg/m$^3$)<br>$k_s = 0.39$ (W/m K)<br>$C_{ps} = 777.21$ (J/kg K)<br>$\epsilon = 0.5$** |
| MOF-5<br>Linker: Terephthalic<br>acid<br>Metal: Zinc | $\frac{q}{\rho_s q_m} = \frac{bP}{bP+1}$<br><br>$b = b_0 e^{\frac{\Delta H}{R_g T}}$ | $q_m = 30.5$ (mol/kg)<br>$b_0 = 1.01$ (GPa$^{-1}$)<br>$\Delta H = 12.3$ (kJ/mol)<br>$k_0 = 3.3$ (s$^{-1}$) | $\rho_s = 621$ (kg/m$^3$)<br>$k_s = 0.32$ (W/m K)<br>$C_{ps} = 750$ (J/kg K)<br>$\epsilon = 0.5$** |
| MIL-101<br>Linker: Terephthalic<br>acid<br>Metal: Chromium<br>Salts | $\frac{q}{\rho_s q_m} = \frac{bP}{bP+1}$<br><br>$b = b_0 e^{\frac{\Delta H}{R_g T}}$ | $q_m = 34$ (mol/kg)<br>$b_0 = 1.79$ (GPa$^{-1}$)<br>$\Delta H = 9.9$ (kJ/mol)<br>$k_0 = 0.025$ (s$^{-1}$)*** | $\rho_s = 440$ (kg/m$^3$)<br>$k_s = 0.05$ (W/m K)<br>$C_{ps} = 643$ (J/kg K)<br>$\epsilon = 0.5$** |
| MOF-74<br>Linker: 2,5-<br>Dihydroxyterephthalic<br>acid<br>Metal: Magnesium | $\frac{q}{\rho_s} = \sum_{i=1}^{2} \frac{q_{m_i} b_i P}{b_i P + 1}$<br><br>$\Delta H = \frac{\Delta H_1 \beta_1 + \Delta H_2 \beta_2}{(\beta_1 + \beta_2)}$<br><br>$\beta_{1(2)} = q_{m_{1(2)}} b_{1(2)} (1 + b_{2(1)} p)^2$<br><br>$b_i = b_{0_i} e^{\frac{\Delta H_i}{R_g T}}$ | $q_{m_1} = 11.0$ (mol/kg)<br>$q_{m_2} = 5.0$ (mol/kg)<br>$b_{01} = 3.01 \times 10^{-4}$ (MPa$^{-1}$)<br>$b_{02} = 4.08 \times 10^{-5}$ (MPa$^{-1}$)<br>$\Delta H_1 = 20.5$ (kJ/mol)<br>$\Delta H_1 = 16.0$ (kJ/mol) | $k_0 = 0.6$ (s$^{-1}$)<br>$\rho_s = 911$ (kg/m$^3$)<br>$k_s = 0.3$ (W/m K)<br>$C_{ps} = 900$ (J/kg K)<br>$\epsilon = 0.5$** |

TABLE A.1-continued

CH$_4$ adsorption isotherms and sorbents intrinsic properties

| | Isotherm | Parameter value | |
|---|---|---|---|
| AX-21<br>Activated carbon | $\frac{q}{\rho_s} = \sum_{i=1}^{2} \frac{q_{m_i} b_i P}{b_i P + 1}$<br><br>$\Delta H = \frac{\Delta H_1 \beta_1 + \Delta H_2 \beta_2}{(\beta_1 + \beta_2)}$<br><br>$\beta_1 = q_{m_i} b_i (1 + b_i p)^2$<br><br>$b_i = b_{0_i} e^{\frac{\Delta H_i}{R_g T}}$ | $q_{m_1}$ = 28.3 (mol/kg)<br>$q_{m_2}$ = 10.5 (mol/kg)<br>$b_{01}$ = 1.01 (GPa$^{-1}$)<br>$b_{02}$ = 1.23 (GPa$^{-1}$)<br>$\Delta H_1$ = 10.7 (kJ/mol)<br>$\Delta H_2$ = 16.6 (kJ/mol) | $k_0$ = 0.1215 (s$^{-1}$)*<br>$\rho_s$ = 972 (kg/m$^3$)<br>$k_s$ = 0.15 (W/m K)<br>$C_{ps}$ = 844 (J/kg K)<br>$\epsilon$ = 0.5 |

*Estimated based on diffusion coefficient, D, of 1 × 10–10 m/s [26] and MOF-5 and MOF-177 particle radius, rc, of 1 × 10–4 m [29] where $k_0$ = 15D/rc2.
**For simplicity, porosity, $\epsilon$, is assumed to be 0.5 for all materials with no impact to the results.
***Due to lack of published values, an estimated mass transfer coefficient, $k_0$, based on similar materials, is used noting that such choice does not affect the equilibrium adsorption results.

TABLE A.2

CO$_2$ adsorption isotherms and sorbents intrinsic properties

| | Isotherm | Parameter value | |
|---|---|---|---|
| CUBTC<br>Linker: benzene-<br>1,3,5-tricarboxylate<br>Metal: Cupper | $\frac{q}{\rho_s q_m} = \frac{bP}{bP + 1}$<br><br>$b = b_0 e^{\frac{\Delta H}{R_g T}}$ | $q_m$ = 18.2 (mol/kg)<br>$b_0$ = 1.37 × 10–4 (MPa$^{-1}$)<br>$\Delta H$ = 25.5 (kJ/mol)<br>$k_0$ = 0.23 (s$^{-1}$) | $\rho_s$ = 703 (kg/m$^3$)<br>$k_s$ = 0.39 (W/m K)<br>$C_{ps}$ = 777.21 (J/kg K)<br>$\epsilon$ = 0.5* |
| MOF-177<br>Linker: 1,3,5-<br>tris(4-carboxyphenyl)<br>benzene<br>Metal: Zinc salt | $\frac{q}{\rho_s q_m} = \frac{bP}{bP + 1}$<br><br>$b = b_0 e^{\frac{\Delta H}{R_g T}}$ | $q_m$ = 48.0 (mol/kg)<br>$b_0$ = 8.06 × 10–4 (MPa$^{-1}$)<br>$\Delta H$ = 14.0 (kJ/mol)<br>$k_0$ = 0.1597 (s$^{-1}$) | $\rho_s$ = 477 (kg/m$^3$)<br>$k_s$ = 0.3 (W/m K)<br>$C_{ps}$ = 490 (J/kg K)<br>$\epsilon$ = 0.5* |
| USO-2-Ni<br>Ni2(1,4-<br>bdc)2(dabco) · 4D<br>MF · 0.5H2O | $\frac{q}{\rho_s q_m} = \frac{\alpha P + 2\beta P^2}{1 + \alpha P + \beta P^2}$<br><br>$q_m = a \exp[-b/R_g T]$<br><br>$\alpha = A \exp[-B/R_g T]$<br><br>$\beta = F \exp[-G/R_g T]$ | a = 2.1 (mol/kg)<br>A = 2.61 (GPa$^{-1}$)<br>F = 1.03 (GPa-2)<br>b = –2.96 (kJ/mol)<br>B = –16.75 (kJ/mol)<br>G = –38.61 (kJ/mol) | $\Delta H$ = 19.9 (kJ/mol)<br>$k_0$ = 0.5 (s$^{-1}$)<br>$\rho_s$ = 531 (kg/m$^3$)<br>$k_s$ = 0.35 (W/m K)<br>$C_{ps}$ = 1160 (J/kg K)<br>$\epsilon$ = 0.5* |
| MOF-74<br>Linker: 2,5-<br>Dihydroxyterephthalic<br>acid<br>Metal: Magnesium | $\frac{q}{\rho_s} = \sum_{i=1}^{2} \frac{q_{m_i} b_i P}{b_i P + 1}$<br><br>$\Delta H = \frac{\Delta H_1 \beta_1 + \Delta H_2 \beta_2}{(\beta_1 + \beta_2)}$<br><br>$\beta_{1(2)} = q_{m_{1(2)}} b_{1(2)} (1 + b_{2(1)} p)$<br><br>$b_i = b_{0_i} e^{\frac{\Delta H_i}{R_g T}}$ | $q_{m_1}$ = 6.8 (mol/kg)<br>$q_{m_2}$ = 9.9 (mol/kg)<br>$b_{01}$ = 2.44 × 10–5 (MPa$^{-1}$)<br>$b_{02}$ = 1.39 × 10–4 (MPa$^{-1}$)<br>$\Delta H_1$ = 42.0 (kJ/mol)<br>$\Delta H_2$ = 24.0 (kJ/mol) | $k_0$ = 0.1215 (s$^{-1}$)<br>$\rho_s$ = 911 (kg/m$^3$)<br>$k_s$ = 0.3 (W/m K)<br>$C_{ps}$ = 900 (J/kg K)<br>$\epsilon$ = 0.5* |
| UIO-67<br>Zr based MOF | $\frac{q}{\rho_s q_m} = \frac{bP}{1 + bP}$<br><br>$q_m = q^\infty \exp[-\alpha/R_g T]$<br><br>$\alpha = A \exp[-B/R_g T]$<br><br>$b = \gamma \exp[-\beta/R_g T]$ | $q^\infty$ = 2.3 (mol/kg)<br>$\gamma$ = 2.82 (GPa$^{-1}$)<br>$\alpha$ = –5.02 (kJ/mol)<br>$\beta$ = –12.51 (kJ/mol)<br>$\Delta H$ = 19.0 (kJ/mol) | $k_0$ = 0.5 (s$^{-1}$)<br>$\rho_s$ = 557 (kg/m$^3$)<br>$k_s$ = 0.35 (W/m K)<br>$C_{ps}$ = 1250 (J/kg K)<br>$\epsilon$ = 0.5* |

*For simplicity, porosity, $\epsilon$, is assumed to be 0.5 for all materials with no affect on the results.

Examples described herein include the following embodiments,

An embodiment described herein provides a system for screening sorbents. The system includes a sample chamber with a hermetic seal and a heat exchanger system. The heat exchanger system includes a heat exchanger disposed in the sample chamber, a coolant circulator fluidically coupled to the heat exchanger, and a sample plate comprising sample wells 123 in contact with the cooling fluid from the coolant circulator. The system also includes a gas delivery system. The gas delivery system includes a gas source and a flow regulator. A temperature measurement system is configured to sense the temperature of the sample wells 123.

In an aspect, the system includes an instrumentation control system coupled to the temperature measurement system to monitor the temperature of the sample wells 123 over time. In an aspect, the system includes a pressure sensor on the sample chamber, wherein the pressure sensor is coupled to the instrumentation control system.

In an aspect, the system includes a vacuum pump coupled to the sample chamber. In an aspect, the system includes a vent valve coupled to the sample chamber.

In an aspect, the sample chamber includes a lid, wherein the lid includes an infrared-transparent window disposed over the sample wells 123. In an aspect, the infrared-transparent window includes quartz or glass.

In an aspect, the temperature measurement system includes an infrared camera. In an aspect, the infrared camera collects data at least at 60 frames per second.

In an aspect, the sample wells 123 are less than 2 mm in inner diameter. In an aspect, the sample wells 123 are about 30 mm in depth. In an aspect, the sample wells 123 are arranged in a staggered configuration on the sample plate.

Another embodiment described herein provides a method for screening sorbents. The method includes measuring temperatures of adsorption for sorbents at a first condition, measuring the temperatures of adsorption of the sorbents at a second condition, and calculating generated heat from the measurements at the first condition and second condition. The method includes measuring the temperatures of adsorption of the sorbents at a third condition, calculating a temperature transient profile from the measurements at the third condition, and calculating a heat of adsorption from measurements collected at two temperatures. Further, the method includes calculating an adsorption isotherm from measurements collected at two temperatures.

In an aspect, the method includes loading sorbents samples into sample wells 123 in a sample plate in a heat exchanger, sealing a lid over a sample chamber holding the heat exchanger, and pulling a vacuum on the sample chamber.

In an aspect, the method includes controlling a temperature of the heat exchanger at a temperature of interest, adding a test gas of interest continuously, and monitoring the temperature of the samples.

In an aspect, the method includes venting the test gas, and pulling a vacuum on the sample chamber to start a new test.

In an aspect, the method includes setting the first condition to be at an initial temperature ($T_{ini}$) of $T_{f1}$ and a heat transfer coefficient of $h_{f1}$. In an aspect, the method includes setting the second condition to be at an initial temperature ($T_{ini}$) of $T_{f1}$ and a heat transfer coefficient of $h_{f2}$. In an aspect, the method includes setting the third condition to be at a heat transfer coefficient of $h_{f1}$.

In an aspect, the method includes calculating the generated heat from the measurements at the first condition and the second condition using the equation:

$$\Delta H^i \langle n \rangle_i = \frac{1}{R} \left\{ h_f^1 \int_0^{\nu_p} \frac{\Delta \langle T \rangle_{i_1}}{\left(\frac{dp}{dt}\right)} dp + \frac{\Delta \langle T \rangle_{i_1}}{\Delta \langle T \rangle_{i_2}(p_z) - \Delta \langle T \rangle_{i_2}(v_2)} \right.$$

$$\left. \left[ h_f^2 \int_0^{p_s} \frac{\Delta \langle T \rangle_{i_2}}{\left(\frac{dp}{dt}\right)} dp - h_f^1 \int_0^{p_s} \frac{\Delta \langle T \rangle_{i_1}}{\left(\frac{dp}{dt}\right)} dp \right] \right\} - \epsilon p.$$

In an aspect, the method includes calculating the generated heat from the measurements at the first condition and the second condition using the equation:

$$\Delta H^i \langle n \rangle_i = \frac{\Delta H^i C_i k_0^i}{2} t^2 - \frac{\Delta H^i C_i k_0^{i^2}}{6} t^3 + O(t^4) = A_i t^2 - B_i t^3.$$

In an aspect, the method includes calculating heat of adsorption from data measured at two different temperatures using the equation:

$$\Delta H^i = -\frac{R_g T^2}{p} \frac{\partial q_i / \partial T_i}{\partial q_i / \partial p}.$$

Other implementations are also within the scope of the following claims.

What is claimed is:

1. A method for screening sorbents, comprising:
   measuring temperatures of adsorption for sorbents at a first condition;
   measuring the temperatures of adsorption of the sorbents at a second condition;
   calculating generated heat from the measurements at the first condition and second condition;
   measuring the temperatures of adsorption of the sorbents at a third condition;
   calculating a temperature transient profile from the measurements at the third condition; and
   calculating a heat of adsorption from measurements collected at two temperatures; and
   calculating an adsorption isotherm from measurements collected at two temperatures.

2. The method of claim 1, comprising:
   loading sorbent samples into sample wells in a sample plate in a heat exchanger;
   sealing a lid over a sample chamber holding the heat exchanger; and
   pulling a vacuum on the sample chamber.

3. The method of claim 2, comprising:
   controlling a temperature of the heat exchanger at a temperature of interest;
   adding a test gas of interest continuously; and
   monitoring the temperature of the sorbent samples.

4. The method of claim 3, comprising:
   venting the test gas; and
   pulling a vacuum on the sample chamber to start a new test.

5. The method of claim 1, comprising setting the first condition to be at an initial temperature ($T_{ini}$) of $T_{f1}$ and a heat transfer coefficient of $h_{f1}$.

6. The method of claim 1, comprising setting the second condition to be at an initial temperature ($T_{ini}$) of $T_{f1}$ and a heat transfer coefficient of $h_{f2}$.

7. The method of claim 1, comprising setting the third condition to be at a heat transfer coefficient of $h_{f1}$.

8. The method of claim 1, comprising calculating the generated heat from the measurements at the first condition and the second condition using the equation:

$$\Delta H^i \langle n \rangle_i = \frac{1}{R} \left\{ h_f^1 \int_0^{\nu} \frac{\Delta \langle T \rangle_{i_1}}{\left(\frac{dp}{dt}\right)} dp + \frac{\Delta \langle T \rangle_{i_1}}{\Delta \langle T \rangle_{i_2}(p_z) - \Delta \langle T \rangle_{i_2}(p_2)} \right.$$

-continued $$\left[h_f^2 \int_0^{p_s} \frac{\Delta \langle T \rangle_{i_2}}{\left(\frac{dp}{dt}\right)} dp - h_f^1 \int_0^{p_s} \frac{\Delta \langle T \rangle_{i_1}}{\left(\frac{dp}{dt}\right)} dp \right]\right\} - \epsilon p.$$

9. The method of claim 1, comprising calculating the generated heat from the measurements at the first condition and the second condition using the equation:

$$\Delta H^i \langle n \rangle_i = \frac{\Delta H^i C_i k_0^i}{2} t^2 - \frac{\Delta H^i C_i k_0^{i2}}{6} t^3 + O(t^4) = A_i t^2 - B_i t^3.$$

10. The method of claim 1, comprising calculating heat of adsorption from data measured at two different temperatures using the equation:

$$\Delta H^i = -\frac{R_g T^2}{p} \frac{\partial q_i / \partial T_i}{\partial q_i / \partial p}.$$

* * * * *

UNITED STATES PATENT AND TRADEMARK OFFICE
CERTIFICATE OF CORRECTION

PATENT NO. : 11,592,381 B2
APPLICATION NO. : 17/162534
DATED : February 28, 2023
INVENTOR(S) : Mohammad G. Alhashim and Mohammed Alshammasi It is certified that error appears in the above-identified patent and that said Letters Patent is hereby corrected as shown below:

In the Claims

In Column 18, Line approximately 64, Claim 8, please replace:

" $$\Delta H^i\langle n\rangle_i = \frac{1}{R}\left\{h_f^1 \int_0^p \frac{\Delta\langle T\rangle_{i_1}}{\left(\frac{dp}{dt}\right)} dp + \frac{\Delta\langle T\rangle_{i_1}}{\Delta\langle T\rangle_{i_1}(p_s) - \Delta\langle T\rangle_{i_2}(p_s)}\right.$$ "

With:

$$\Delta H^i\langle n\rangle_i = \frac{1}{R}\left\{h_f^1 \int_0^p \frac{\Delta\langle T\rangle_{i_1}}{\left(\frac{dp}{dt}\right)} dp \right.$$
$$\left. + \frac{\Delta\langle T\rangle_{i_1}}{\Delta\langle T\rangle_{i_1}(p_s) - \Delta\langle T\rangle_{i_2}(p_s)} \left[ h_f^2 \int_0^{p_s} \frac{\Delta\langle T\rangle_{i_2}}{\left(\frac{dp}{dt}\right)} dp - h_f^1 \int_0^{p_s} \frac{\Delta\langle T\rangle_{i_1}}{\left(\frac{dp}{dt}\right)} dp \right]\right\} - \epsilon p$$

--.

Signed and Sealed this
Twenty-third Day of May, 2023

*Katherine Kelly Vidal*

Katherine Kelly Vidal
*Director of the United States Patent and Trademark Office*